United States Patent
Sheppard et al.

(10) Patent No.: US 10,433,008 B2
(45) Date of Patent: *Oct. 1, 2019

(54) METHODS AND APPARATUS TO UTILIZE MINIMUM CROSS ENTROPY TO CALCULATE GRANULAR DATA OF A REGION BASED ON ANOTHER REGION FOR MEDIA AUDIENCE MEASUREMENT

(71) Applicant: The Nielsen Company (US), LLC, New York, NY (US)

(72) Inventors: Michael Sheppard, Brooklyn, NY (US); Jonathan Sullivan, Hurricane, UT (US); Peter Lipa, Tucson, AZ (US); Alejandro Terrazas, Santa Cruz, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,926

(22) Filed: Sep. 28, 2018

(65) Prior Publication Data

US 2019/0069024 A1    Feb. 28, 2019

Related U.S. Application Data

(63) Continuation of application No. 15/787,521, filed on Oct. 18, 2017, now Pat. No. 10,091,547, which is a (Continued)

(51) Int. Cl.
*H04N 7/16*    (2011.01)
*H04N 21/442*    (2011.01)
(Continued)

(52) U.S. Cl.
CPC ..... *H04N 21/44218* (2013.01); *H04N 21/252* (2013.01); *H04N 21/25883* (2013.01); *H04N 21/44222* (2013.01)

(58) Field of Classification Search
CPC ....... H04N 21/25833; H04N 21/25891; H04N 21/42201

See application file for complete search history.

(56) References Cited

U.S. PATENT DOCUMENTS 6,108,637 A   8/2000   Blumenau
7,139,723 B2  11/2006  Conkwright et al.
(Continued)

OTHER PUBLICATIONS

Abernethy et al., "Online Collaborative Filtering," University of California at Berkeley, Technical Report, 2007, 9 Pages.
(Continued)

*Primary Examiner* — Pankaj Kumar
*Assistant Examiner* — Timothy R Newlin
(74) *Attorney, Agent, or Firm* — Hanley, Flight & Zimmerman, LLC

(57) ABSTRACT

Methods and apparatus to utilize a minimum cross entropy to calculate granular data of a region based on another region for media audience measurement. An example method for calculating granular data of a region for media audience measurement includes determining, by executing first instructions via a processor, aggregate behavioral data associated with a measurement of a media audience of a target region; determining, by executing second instructions via the processor, aggregate demographics data of the target region; and determining, by executing third instructions via the processor, granular data of a source region. The example method includes calculating, by executing fourth instructions via the processor, granular data of the media audience of the target region by utilizing minimum cross entropy to apportion the aggregate demographics data and the aggregate behavioral data of the target region based on the granular data of the source region to determine.

13 Claims, 9 Drawing Sheets

Related U.S. Application Data continuation of application No. 15/055,257, filed on Feb. 26, 2016, now Pat. No. 9,800,928.

(51) Int. Cl.
*H04N 21/25* (2011.01)
*H04N 21/258* (2011.01)

(56) References Cited

U.S. PATENT DOCUMENTS

| | | | |
|---|---|---|---|
| 7,146,329 | B2 | 12/2006 | Conkwright et al. |
| 7,194,421 | B2 | 3/2007 | Conkwright et al. |
| 7,197,472 | B2 | 3/2007 | Conkwright et al. |
| 8,151,194 | B1 | 4/2012 | Chan et al. |
| 8,290,800 | B2 | 10/2012 | Law et al. |
| 8,341,009 | B1 | 12/2012 | Algranati |
| 8,370,489 | B2 | 2/2013 | Mazumdar et al. |
| 8,504,507 | B1 | 8/2013 | Srinivasaiah |
| 8,543,523 | B1 | 9/2013 | Palit et al. |
| 8,694,359 | B2 | 4/2014 | Algranati |
| 8,887,188 | B2 | 11/2014 | Hadfield et al. |
| 9,015,750 | B2 | 4/2015 | Knee et al. |
| 9,092,805 | B2 | 7/2015 | Dittus |
| 2005/0246391 | A1* | 11/2005 | Gross .............. G06F 17/3089 |
| 2006/0287916 | A1* | 12/2006 | Starr .................. G06Q 30/02 705/14.46 |
| 2007/0271518 | A1 | 11/2007 | Tischer et al. |
| 2008/0059988 | A1* | 3/2008 | Lee .................... G06Q 30/02 725/9 |
| 2008/0097950 | A1* | 4/2008 | Kobayashi .......... G06Q 30/02 706/52 |
| 2008/0300965 | A1 | 12/2008 | Doe |
| 2010/0057560 | A1 | 3/2010 | Skudlark et al. |
| 2010/0211462 | A1 | 8/2010 | Nowacek |
| 2013/0159499 | A1* | 6/2013 | Besehanic .......... H04L 61/1511 709/224 |
| 2013/0198125 | A1* | 8/2013 | Oliver .............. G06Q 30/0246 706/46 |
| 2013/0262181 | A1 | 10/2013 | Topchy et al. |
| 2013/0262636 | A1 | 10/2013 | Yuh et al. |
| 2014/0013345 | A1 | 1/2014 | Vinson et al. |
| 2014/0313188 | A1 | 10/2014 | Cohen et al. |
| 2015/0089523 | A1 | 3/2015 | Volovich et al. |
| 2015/0186536 | A1 | 7/2015 | Bosworth et al. |
| 2015/0334458 | A1* | 11/2015 | Srinivasan .......... H04N 21/482 725/14 |
| 2016/0203211 | A1* | 7/2016 | Milton ............ G06F 17/30241 705/14.58 |
| 2017/0118532 | A1 | 4/2017 | Sullivan et al. |
| 2017/0251253 | A1 | 8/2017 | Sheppard et al. |

OTHER PUBLICATIONS

Cbonline, "Community Broadcasting Database: Survey of the Community Radio Sector, 2007-2008 Financial Period", Nov. 2009, 42 pages.

D'Ambrosio et al., "Robust Tree-Based Incremental Imputation Method for Data Fusion", Advances in Intelligent Data Analysis VII, 2007, 10 pages.

Garland et al., "Different From You and Me", Print and Digital Research Forum, 2013, [http://www.pdrf.net/wp-content/uploads/2013/11/46GarlandLazarus.pdf], retrieved on Apr. 23, 2015, 28 pages.

Robilliard et al., "Reconciling Household Surveys and National Accounts Data Using a Cross Entropy Estimation Method," Review of Income and Wealth, Series 49, No. 3, Sep. 2003, 12 Pages.

Rubinstein, "Semi-Iterative Minimum Cross-Entropy Algorithms for Rare-Events, Counting, Combinatorial and Integer Programming", Methodology and Computing in Applied Probability, 10, p. 121-178, 2008, 59 pages.

United States Patent and Trademark Office, "Non-Final Office Action," issued in connection with U.S. Appl. No. 15/055,257, dated Mar. 3, 2017, 6 pages.

United States Patent and Trademark Office, "Non-Final Office Action," issued in connection with U.S. Appl. No. 15/055,257, dated Nov. 4, 2016, 5 pages.

United States Patent and Trademark Office, "Notice of Allowance and Fee(s) Due," issued in connection with U.S. Appl. No. 15/055,257, dated Jun. 22, 2017, 15 pages.

United States Patent and Trademark Office, "Non-Final Office Action", issued in connection with U.S. Appl. No. 14/921,921, dated Jul. 13, 2018, 5 pages.

United States Patent and Trademark Office, "Notice of Allowance and Fees(s) Due", in connection with Parent U.S. Appl. No. 15/787,521, dated May 18, 2018, 5 pages.

United States Patent and Trademark Office, "Non-Final Office Action," issued in connection with U.S. Appl. No. 15/787,521, dated Feb. 26, 2018, 7 pages.

United States Patent and Trademark Office, "Final Office Action," issued in connection with U.S. Appl. No. 14/921,921, dated Nov. 14, 2018, 5 pages.

United States Patent and Trademark Office, "Notice of Allowance," dated Mar. 6, 2019 in connection ith U.S. Appl. No. 14/921,921 (5 pages).

* cited by examiner

_US 10,433,008 B2_

METHODS AND APPARATUS TO UTILIZE MINIMUM CROSS ENTROPY TO CALCULATE GRANULAR DATA OF A REGION BASED ON ANOTHER REGION FOR MEDIA AUDIENCE MEASUREMENT

RELATED APPLICATION

This patent arises from a continuation of U.S. patent application Ser. No. 15/787,521, filed on Oct. 18, 2017, granted as U.S. Pat. No. 10,091,547 and entitled "METHODS AND APPARATUS TO UTILIZE MINIMUM CROSS ENTROPY TO CALCULATE GRANULAR DATA OF A REGION BASED ON ANOTHER REGION FOR MEDIA AUDIENCE MEASUREMENT," which arose from a continuation of U.S. patent application Ser. No. 15/055,257, filed on Feb. 26 2016, granted as U.S. Pat. No. 9,800,928 and entitled "METHODS AND APPARATUS TO UTILIZE MINIMUM CROSS ENTROPY TO CALCULATE GRANULAR DATA OF A REGION BASED ON ANOTHER REGION FOR MEDIA AUDIENCE MEASUREMENT." U.S. patent application Ser. No. 15/787,521 and U.S. patent application Ser. No. 15/055,257 are hereby incorporated by reference in their entireties. Priority to U.S. patent application Ser. No. 15/055,257 is claimed.

FIELD OF THE DISCLOSURE

This disclosure relates generally to audience measurement, and, more particularly, to utilizing minimum cross entropy to calculate granular data of a region based on another region for media audience measurement.

BACKGROUND

Audience measurement entities often collect demographic information (e.g., age, race, gender, income, education level, etc.) of a population by having members of the population complete a survey (e.g., door-to-door, mail, online, etc.).

Some audience measurement entities or other entities also collect behavioral data (e.g., viewing data and/or tuning data for television programming, advertising, movies, etc.) from households of a population (e.g., upon obtaining consent from the households). In some instances, the audience measurement entities collect viewing data (e.g., data related to media viewed by a member of the household) from each member of the household. To identify which household member is exposed to displayed media, the audience measurement entities often employ meters (e.g., personal people meters) to monitor the members and/or media presentation devices (e.g., televisions) of the household.

Some audience measurement entities may also collect tuning data from media presentation device (e.g., set-top boxes) of households of a population. For example, the media presentation device may record tuning data that is associated with tuning events of the media presentation device (e.g., turning a set-top box on or off, changing a channel, changing a volume), and the audience measurement entities may associate the collected tuning data with information associated with the household at which the media presentation device is located.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
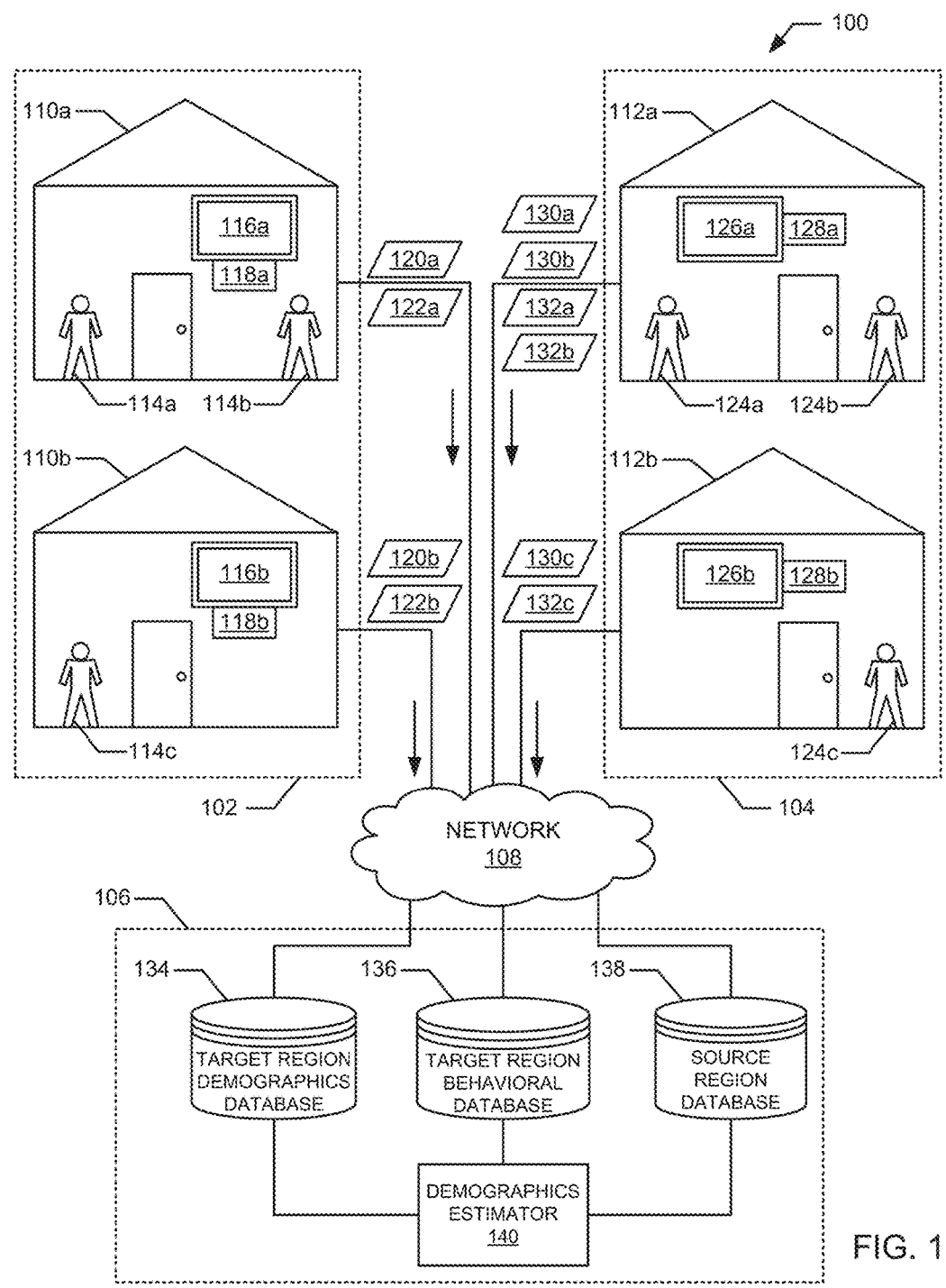
FIG. 1 is a block diagram of an example environment in which aggregate data of a target region and granular data of a source region may be collected to utilize minimum cross entropy to calculate granular data of a media audience of the target region in accordance with the teachings of this disclosure.

Audience measurement entities (AMEs) and other entities measure composition and size of audiences consuming media to produce ratings of the media. Ratings may be used by advertisers and/or marketers to develop strategies and plans to purchase advertising space and/or in designing advertising campaigns. Additionally, media producers and/or distributors may use the ratings to determine how to set prices for advertising space and/or to make programming decisions. To measure the composition and size of an audience, AMEs (e.g., The Nielsen Company (US), LLC®) track audience members' exposure to media and associate demographics data, demographics information and/or demographics of the audience members (e.g., age, gender, race, education level, income, etc.) with the exposed media. Demographics data of an audience member and/or an audience associated with exposed media may include a plurality of characteristics of the audience member and/or the audience as a whole.

As used herein, a demographic characteristic in demographics data is referred to as a "demographic dimension." For example, demographic dimensions may include age, gender, age and gender, income, race, nationality, geographic location, education level, religion, etc. A demographic dimension may include, be made up of and/or be divided into different groupings.

As used herein, each grouping of a demographic dimension is referred to as a "demographic marginal" (also referred to herein as a "demographic group" and/or a "demographic bucket"). For example, a "gender" demographic dimension includes a "male" demographic marginal and a "female" demographic marginal.

As used herein, a "demographic constraint" refers to a demographic marginal or a combination of independent demographic marginals of interest (e.g., a combination of demographic marginals of different respective demographic dimensions, demographic joint-marginals or distributions). An example demographic constraint includes a marginal from an "age/gender" demographic dimension. Another example demographic constraint includes a combination of a marginal from a race demographic dimension, a marginal from an "age/gender" demographic dimension, and a marginal from an "education level" demographic dimension (e.g., a Latina, 18-45 year-old male, and a master's degree).

To obtain demographics data of audience members and associate exposed media with demographics data of its audience, AMEs often enlist panelists and/or panelist households to participate in measurement panels. In some such examples, media exposure and/or demographics data associated with the panelists is collected and used to project a size and demographic makeup of a population. The panelists provide demographics data to the AMEs via, for example, self-reporting to the AMEs, responses to surveys, consenting to the AMEs obtaining demographics data from database proprietors (e.g., Facebook, Twitter, Google, Yahoo!, MSN, Apple, Experian, etc.), etc.

In some audience measurement systems, panelists consent to AMEs or other entities collecting exposure data by measuring exposure of the panelists to media (e.g., television programming, radio programming, online content, programs, advertising, etc.). As used herein, "exposure data" refers to information pertaining to media exposure events presented via a media presentation device (e.g., a television, a stereo, a speaker, a computer, a portable device, a gaming console, an online media presentation device, etc.) of a household (e.g., a panelist household) and associated with a person and/or a group of persons of the household (e.g., panelist(s), member(s) of the panelist household). For example, exposure data includes information indicating that a panelist is exposed to particular media if the panelist is present in a room in which the media is being presented. To enable the AMEs to collect such exposure data, the AMEs typically provide panelists and/or panelist households with meter(s) that monitor media presentation devices (e.g., televisions, stereos, speakers, computers, portable devices, gaming consoles, and/or online media presentation devices, etc.).

Enlisting and retaining panelists for audience measurement can be a difficult and costly process for AMEs. For example, AMEs must carefully select and screen panelists for particular characteristics so that a population of the panelists is representative of the population as a whole. Further, panelists must diligently perform specific tasks to enable the collected demographics and exposure data to accurately reflect the panelist activities. For example, to identify that a panelist is exposed to a particular media, some AMEs provide the panelist and/or panelist household with a meter (e.g., a people meter) that monitors media presentation devices of the corresponding panelist household. A people meter is an electronic device that is typically positioned in a media access area (e.g., an exposure area such as a living room of the panelist household) and is proximate to and/or carried by one or more panelists.

In some examples, the cost of selecting, monitoring, and analyzing enough panelists to produce a sufficiently representative subsection of a region (e.g., a city, a county, etc.) may be substantial. As a result, the costs incurred to monitor panelists of small regions (e.g., low population-density regions, small cities, etc.) may be prohibitively expensive for an AME to produce media exposure and/or demographics data for such regions. Accordingly, AMEs often elect to enlist and monitor panelists and, thus, collect media exposure and/or demographics data for only the largest and/or most densely-populated regions.

Further, some households which are otherwise desirable for AMEs may elect not to be a panelist household. For example, some household members do not want to interact with a people meter before being exposed to media. For example, based on one or more triggers (e.g., a channel change of a media presentation device or an elapsed period of time), some people meters generate a prompt for panelists to provide presence and/or identity information by depressing a button of the people meter. Although periodically inputting information in response to a prompt may not be burdensome when required for a short period of time, some people find the prompting and data input tasks to be intrusive and annoying over longer periods of time.

Because collecting information from panelists can be difficult and costly, AMEs and other entities interested in measuring media/audiences have begun to collect information from people and/or households that are not traditional panelists via other sources such as data collected by set-top boxes and/or over-the-top devices (e.g., a Roku media device, an Apple TV media device, a Samsung TV media device, a Google TV media device, a Chromecast media device, an Amazon TV media device, a gaming console, a smart TV, a smart DVD player, an audio-streaming device, etc.). A set-top box (STB) is a device that converts source signals into media presented via a media presentation device. In some examples, the STB implements a digital video recorder (DVR) and/or a digital versatile disc (DVD) player. Some media presentation devices such as televisions, STBs and over-the-top devices are capable of recording tuning data for media presentation.

As used herein, "tuning data" refers to information pertaining to tuning events (e.g., a STB being turned on or off, channel changes, volume changes, tuning duration times, etc.) of a media presentation device of a household that is not associated with demographics data (e.g., number of household members, age, gender, race, etc.) of the household and/or members of the household. To collect the tuning data of a media presentation device, consent is often obtained from the household members for such data acquisition (e.g., via a third-party media provider and/or manufacturer, the AME, etc.). Many people are willing to provide tuning data via a media presentation device, because personalized information is not collected by the media presentation device and repeated actions are not required of the household members. As used herein, people that consent to collection of tuning data (e.g., via a media presentation device), but do not consent (and/or are not asked to consent) to collection of exposure data (e.g., media exposure data that is tied to a particular person such as a panelist) and/or demographics data, are referred to as "non-panelists." While collecting tuning data from non-panelists can greatly increase the amount collected data about media presentation and/or exposure, the lack of exposure data and/or demographic data reduces the value of this collected data.

To increase the value of tuning data collected from non-panelists in measuring the composition and size of audiences exposed to media in a region, methods and apparatus disclosed herein enable AMEs (or any other entity) to utilize minimum cross entropy to determine granular data of a media audience of a region of interest (e.g., a target region, a region of non-panelists) based on aggregate behavioral data (e.g., aggregate tuning data) of the region of interest, aggregate demographics data of the region of interest, and granular data of another region (e.g., a source region, a region of panelists).

As used herein, a "region of panelists," a "panelist region," and a "source region" refer to a geographic region (e.g., a neighborhood, a township, a city, a county, etc.) that includes panelists from which data (e.g., demographics data, behavioral data) is collected to estimate granular data of that region. An example panelist region is a city (e.g., Chicago, Ill.) that includes panelists from which an AME and/or other entity collects demographic data (e.g., age, gender, income, highest-level education, political affiliation) and behavioral data (e.g., tuning data, viewing data, online activity data, purchasing data, etc.) to estimate the granular data for the city.

As used herein, "granular data," "granular demographics," and "granular demographics data" refer to demographics data and behavioral data of a region (e.g., a panelist region, a non-panelist region) that indicate a relationship between demographic constraints of the demographics data and behavioral constraints of the behavioral data of the region. For example, granular data identifies a count or percentage of members of the region satisfying a demographic constraint of interest that also satisfy a behavioral constraint of interest. For example, granular data may indicate that a region's audience for the show "Mike & Molly" (i.e., a behavioral constraint) includes 10% of members of a region satisfying a "young female" demographic constraint, 25% of members of the region satisfying an "old female" demographic constraint, 15% of members of a region satisfying a "young male" demographic constraint, and 30% of members of the region satisfying an "old male" demographic constraint viewed.

As used herein, a "region of non-panelists," a "non-panelist region," and a "target region" refer to a geographic region (e.g., a neighborhood, a township, a city, a county, etc.) that includes non-panelists from which non-person-specific aggregate data (e.g., aggregate behavioral data, aggregate demographics data) is collected. An example non-panelist region is a city (e.g., Rockford, Ill.) that includes non-panelists from which an AME and/or other entity collects aggregate demographic data (e.g., age, gender, income, highest-level education, political affiliation) and aggregate behavioral data (e.g., tuning data, viewing data, online activity data, purchasing data, etc.) of the region.

As used herein, "aggregate behavioral data" refers to non-person-specific data of a region (e.g., a non-panelist region) that indicates a count and/or percentage of members of the region satisfying behavioral constraint(s) of interest. Example aggregate behavioral data of a region includes aggregate tuning data collected from set-top boxes and/or over-the-top devices of households within the region that are associated with tuning events of a corresponding media presentation device, the set-top box (e.g., turning a set-top box on or off, changing a channel, changing a volume), the over-the-top device, etc.

As used herein, a "behavioral constraint" refers to an event of interest (e.g., a tuning event, an exposure event) associated with a member (e.g., a panelist, a non-panelist) and/or a group of members of a region (e.g., a panelist region, a non-panelist region). An example behavioral constraint includes media events tuned or exposed to members of a region. For example, behavioral constraints include tuning to and/or viewing a channel (e.g., CBS) and/or a program (e.g., Mike & Molly) at a particular time (7:30 P.M. on Monday).

As used herein, "aggregate demographics data" and "aggregate demographics" refer to non-person-specific data of a region (e.g., a non-panelist region) that indicates a count and/or percentage of members of the region that satisfy demographic constraint(s) of interest. The aggregate demographics data of a region may be collected via a survey-based census (e.g. a government-funded census, a privately-funded census) of the region.

Example methods and apparatus disclosed herein utilize minimum cross entropy to determine granular data of a media audience of a non-panelist region based on aggregate demographics data and aggregate behavioral data of the non-panelist region and granular data of a panelist region. For example, an AME (or any other entity) obtains aggregate demographics data of the non-panelist region that indicates a count or percentage of members of the non-panelist region that satisfy demographic constraints of interest (e.g., a "young female" demographic constraint, an "old male" demographic constraint, etc.). Further, the example AME obtains aggregate behavioral data of the non-panelist region that indicates a count or percentage of members of the non-panelist region that satisfy behavioral constraints of interest (e.g., a behavioral constraint for the show "Good Times", a behavioral constraint for the show "ER", etc.). Further, the example AME obtains granular data of the panelist region that indicates a count or percentage of panelists satisfying the demographic constraints of interest that also satisfy the behavioral constraints of interest (e.g., a percentage of panelists satisfying the "old male" demographic constraint that also satisfy the behavioral constraint for the show "Good Times," a percentage of panelists satisfying the "young female" demographic constraint that also satisfy the behavioral constraint for the show "ER," etc.).

Based on the obtained data of the non-panelist region and the panelist region, the example AME utilizes the minimum cross entropy to determine the granular data of the media audience of the non-panelist region. The AME utilizes the minimum cross entropy to enable multiple probability distributions (e.g., aggregate demographics data, aggregate behavioral data, granular demographics and behavioral data, etc.) that relate to overlapping sets of events or characteristics (e.g., shared demographics and/or behavioral constraints) to be compared. For example, by utilizing the minimum cross entropy, the example AME is able to determine an estimate of the granular data of the media audience of the non-panelist region even if there are non-linear relationships between the obtained aggregate data of the non-panelist region and the obtained granular data of the panelist region. In some examples, the AME determines whether to determine the granular data of the media audience of the target region via the minimum cross entropy by evaluating the obtained granular data of the panelist region. For example, the AME may analyze the sample size, the margin of error, and/or other factors that indicate a high degree of confidence of the obtained granular data of the panelist region to determine whether to utilize the minimum cross entropy to determine the granular data of the non-panelist region.

By utilizing the minimum cross entropy, the example AME calculates a count or percentage of the non-panelist region members satisfying the demographic constraints of interest that also satisfy the behavioral constraints of interest. As a result, the example methods and apparatus disclosed herein enable AMEs and/or other entities to estimate granular data for a region in which, for example, no panelists are employed by utilizing census data and tuning data associated with that region. Thus, the example methods and apparatus enable an AME and/or other entity to obtain granular data of a region that may be used to produce audience measurement ratings for that region without having to enlist and monitor panelists within that region. Accordingly, by obtaining granular data of regions while reducing a number of regions in which panelists are enlisted and monitored, the example methods and apparatus disclosed herein reduce processing resources utilized by computer networked data collection systems to meter regions and/or to transmit collected data of the metered regions. While the example methods and apparatus may facilitate estimation of regions in which panelists are not employed, a few or many panelists may optionally be employed in regions in which estimates are computed.

Additionally or alternatively, the example methods and apparatus disclosed herein may be used with the Online Campaign Ratings (OCR) systems and/or Digital Ad Rating (DAR) systems developed by The Nielsen Company (US), LLC to monitor online activity. Example OCR and DAR systems employ a technique disclosed in Blumenau, U.S. Pat. No. 6,108,637, in which media distributed via a computer network (e.g., the Internet) is tagged with monitoring instructions (e.g., also known as beacon instructions). In particular, monitoring instructions are associated with the Hypertext Markup Language (HTML) of the media to be tracked. When a client (e.g., a media presentation device) requests the media, both the media and the beacon instructions are downloaded to the client. The beacon instructions are, thus, executed whenever the media is accessed, be it from a server or from a cache. The beacon instructions cause monitoring data reflecting information about the access to the media to be sent from the client that downloaded the media to a monitoring entity. Typically, the monitoring entity is an AME that did not provide the media to the client and who is a trusted third party for providing accurate usage statistics (e.g., The Nielsen Company, LLC). Because the beaconing instructions are associated with the media and executed by the client browser whenever the media is accessed, the monitoring information is provided to the AME irrespective of whether the client is a panelist of the AME.

In such examples involving OCR and/or DAR systems, the methods and apparatus disclosed herein enable an AME to utilize minimum cross entropy to determine granular data of a media audience of a region for activities (e.g., impressions of online activity) conducted by region members via a computer network system (e.g., the Internet) and monitored by an AME or other entity via a computer networked data collection system. Example methods and apparatus disclosed herein utilize the minimum cross entropy to determine the granular data of the media audience of the region (e.g., a scaling value or weight for region members satisfying a demographic constraint) based on aggregate behavioral data of the region (e.g., a total count of online impressions recorded by the computer networked data collection system), aggregate demographics data of the region (e.g., a count of region members satisfying the demographic constraint that have their online impression recorded for the demographic constraint by the computer networked data collection system), and granular data of a sub-population of panelists of the region (e.g., a scaling value or weight for panelists satisfying the demographic constraint).

Further, the example methods and apparatus disclosed herein relate to subject matter disclosed in U.S. patent application Ser. No. 14/921,921, entitled "Methods and Apparatus to Calculate Granular Data of a Region Based on Another Region for Media Audience Measurement" and filed on Oct. 23, 2015, which is incorporated herein by reference in its entirety.

Disclosed example methods for calculating granular data of a region for media audience measurement include determining, by executing first instructions via a processor, aggregate behavioral data associated with a measurement of a media audience of a target region. The aggregate behavioral data includes a first count of target region audience members satisfying a behavioral constraint. The example methods include determining, by executing second instructions via the processor, aggregate demographics data of the target region. The aggregate demographics data includes a second count of the target region audience members satisfying a first demographic constraint and a third count of the target region audience members satisfying a second demographic constraint. The example methods include determining, by executing third instructions via the processor, granular data of a source region. The granular data includes a fourth count of source region audience members satisfying the behavioral constraint and the first demographic constraint and a fifth count of the source region audience members satisfying the behavioral constraint and the second demographic constraint. The example methods include calculating, by executing fourth instructions via the processor, granular data of the media audience of the target region by utilizing minimum cross entropy to apportion the aggregate demographics data and the aggregate behavioral data of the target region based on the granular data of the source region. The granular data of the media audience of the target region includes a sixth count of the target region audience members satisfying the behavioral constraint and the first demographic constraint and a seventh count of the target region audience members satisfying the behavioral constraint and the second demographic constraint.

In some example methods, the first demographic constraint and the second demographic constraint are mutually exclusive.

In some example methods, utilizing the minimum cross entropy to calculate the granular data of the media audience of the target region includes performing non-linear optimization based on the granular data of the source region, the aggregate demographics data of the target region, and the aggregate behavioral data of the target region. In some such example methods, utilizing the minimum cross entropy to calculate the granular data of the media audience of the target region includes defining an optimization constraint based on the aggregate behavioral data and the aggregate demographics data of the target region. The non-linear optimization is limited by the optimization constraint. Some such example methods include, prior to utilizing the minimum cross entropy, determining whether to calculate the granular data of the media audience of the target region via the minimum cross entropy by evaluating the fourth count and the fifth count of the granular data of the source region.

In some example methods, determining the aggregate behavioral data of the target region includes determining tuning data of the target region and determining the granular data of the source region includes determining exposure data of the source region. The target region is a non-panelist region and the source region is a panelist region. The non-panelist region and the panelist region are mutually exclusive.

In some example methods, determining the aggregate behavioral data of the target region includes determining impressions data of the population and determining the granular data of the source region includes determining impressions data associated with demographics data of the panelists. The target region is a population and the source region is a sub-region of panelists of the population.

In some example methods, determining the granular data of the target region based on the aggregate demographics data of the target region, the aggregate behavioral data of the target region, and the granular data of the source region reduces an amount of data collected by computer networked data collection systems to determine the granular data of the target region by calculating the granular data of the target region without collecting the granular data from the target region.

In some example methods, the processor includes at least a first processor of a first hardware computer system and a second processor of a second hardware computer system.

Disclosed example apparatus for calculating granular data of a region for media audience measurement include a target region determiner to determine aggregate behavioral data associated with a measurement of a media audience of a target region. The aggregate behavioral data includes a first count of target region audience members satisfying a behavioral constraint. The target region determiner is to determine aggregate demographics data of the target region. The aggregate demographics data includes a second count of the target region audience members satisfying a first demographic constraint and a third count of the target region audience members satisfying a second demographic constraint. The example apparatus include a source region determiner to determine granular data of a source region. The granular data includes a fourth count of source region audience members satisfying the behavioral constraint and the first demographic constraint and a fifth count of the source region audience members satisfying the behavioral constraint and the second demographic constraint. The example apparatus include a target region calculator to calculate granular data of the media audience of the target region by utilizing minimum cross entropy to apportion the aggregate demographics data and the aggregate behavioral data of the target region based on the granular data of the source region. The granular data of the media audience of the target region includes a sixth count of the target region audience members satisfying the behavioral constraint and the first demographic constraint and a seventh count of the target region audience members satisfying the behavioral constraint and the second demographic constraint.

In some example apparatus, the first demographic constraint and the second demographic constraint are mutually exclusive.

In some example apparatus, the target region calculator utilizes the minimum cross entropy to determine the granular data of the media audience of the target region by performing non-linear optimization based on the granular data of the source region, the aggregate demographics data of the target region, and the aggregate behavioral data of the target region. In some such examples, the target region calculator is to utilize the minimum cross entropy to determine the granular data of the media audience of the target region by defining an optimization constraint based on the aggregate behavioral data and the aggregate demographics data of the target region. The non-linear optimization is limited by the optimization constraint. Some such example apparatus include that, prior to the target region calculator utilizing the minimum cross entropy, the target region calculator is to determine whether to determine the granular data of the media audience of the target region by evaluating the fourth count and the fifth count of the granular data of the source region.

In some example apparatus, the target region determiner is to determine tuning data of the target region to determine the aggregate behavioral data of the target region and is to determine exposure data of the source region to determine the granular data of the source region. The target region is a non-panelist region and the source region is a panelist region. The non-panelist region and the panelist region are mutually exclusive.

In some example apparatus, the target region determiner is to determine impressions data of the population to determine the aggregate behavioral data of the target region and is to determine impressions data associated with demographics data of the panelists to determine the granular data of the source region. The target region is a population and the source region is a sub-region of panelists of the population.

FIG. 1 is a block diagram of an example environment 100 that includes a target region 102, a source region 104, an AME 106, and a network 108. In the illustrated example, the target region 102 (e.g., a non-panelist region) includes households 110a, 110b (e.g., non-panelist households), and the source region 104 (e.g., a panelist region) includes households 112a, 112b (e.g., panelist households). As discussed in further detail below, the AME 106 of the example environment 100 calculates and/or estimates granular data of the target region 102 (e.g., to produce media ratings of the target region 102) based on aggregate demographics data and aggregate behavioral data of the target region 102 and granular data of the source region 104. Further, as discussed below, the network 108 of the illustrated example, among other things, communicatively couples the AME 106 to the households 110a, 110b, 112a, 112b of the respective first and source regions 102, 104.

The households 110a, 110b (e.g., non-panelist households) of the target region 102 (e.g., a non-panelist region) include respective members 114a, 114b, 114c (e.g., non-panelists), media presentation devices 116a, 116b, and STBs 118a, 118b. For example, the household 110a includes the members 114a, 114b, the media presentation device 116a, and the STB 118a, and the household 110b includes the member 114c, the media presentation device 116b, and the STB 118b.

In some examples, the households 110a, 110b are representative of many other households (e.g., other non-panelist households) that may be included in the example target region 102. Characteristics of the other households (e.g., a number of household members, demographics of the household members, a number of televisions, etc.) may be similar to and/or different from those of the representative households 110a, 110b. For example, other households include one member, two members, three members, four members, etc.

The STBs 118a, 118b of the illustrated example convert source signals into media that are presented via the respective media presentation devices 116a, 116b. In some examples, the STBs 118a, 118b implement a digital video recorder (DVR) and/or a digital versatile disc (DVD) player. In the illustrated example, the STBs 118a, 118b are in communication with the respective media presentation device 116a, 116b via wireless connections (e.g., Bluetooth, Wi-Fi, etc.) or via wired connections (e.g., Universal Serial Bus (USB), etc.) to transmit converted source signals from the STBs 118a, 118b to the respective media presentation devices 116a, 116b. In some examples, the STBs 118a, 118b are integrated into the respective media presentation devices 116a, 116b. In the illustrated example, the media presentation devices 116a, 116b are televisions. In alternative examples, the media presentation devices 116a, 116b are computers (e.g., desktop computers, laptop computers, etc.), speakers, stereos, portable devices (e.g., tablets, smartphones, etc.), gaming consoles (e.g., Xbox Ones®, Playstation® 4s, etc.), online media presentation devices (e.g., Google Chromecasts, Rokus® Streaming Sticks®, Apple TVs®, etc.) and/or any other type of media presentation devices.

As illustrated in FIG. 1, the tuning data 120a, 120b (e.g., behavioral data) and demographics data 122a, 122b are collected from the respective households 110a, 110b of the target region 102. The tuning data 120a, 120b collected by the example STBs 118a, 118b are associated with tuning events of the STBs 118a, 118b and/or the respective media presentation devices 116a, 116b (e.g., turning the STBs 118a, 118b on or off, changing channels presented via the media presentation devices 116a, 116b, increasing or lowering the volume, remaining on a channel for a duration of time, etc.) to monitor media (e.g., television programming, radio programming, movies, songs, advertisements, Internet-based programming such as websites and/or streaming media, etc.) presented by the respective media presentation devices 116a, 116b. For example, the tuning events of the tuning data 120a, 120b are identified by channel (e.g., CBS, ABC, Fox, TV Land, TBS, FXX, etc.) and time (e.g., a particular time such as 7:10 A.M. or 8:31 P.M., a predetermined time-period segment such as 7:00-7:15 A.M. or 8:00-8:30 P.M., etc.).

The tuning data 120a, 120b collected and/or recorded by the respective STBs 118a, 118b do not include exposure data (e.g., data indicating which members are exposed to particular media) or demographics data (e.g., data indicating a number of household members, age, gender, race, etc.) of the respective households 110a, 110b. For example, if the household member 114b is viewing the show "Roseanne" via the media presentation device 116a, the tuning data 120a recorded by the STB 118a indicates that the STB 118a was tuned to TV Land at 6:00 A.M. on Friday, but does not identify that the household member 114b was exposed to the show "Roseanne" or include demographics data of the household member 114b.

The example demographics data 122a, 122b include information regarding demographic constraints (e.g., demographic marginals of respective demographic dimensions, combinations of demographic marginals of combinations of respective demographic dimensions, etc.) of the target region 102, but do not include member-specific information of the members 114a, 114b, 114c or household-specific information of the households 110a, 110b of the target region 102. That is, the example demographics data 122a, 122b do not indicate which members 114a, 114b, 114c or households 110a, 110b of the target region 102 are associated with demographics of the collected demographics data 122a, 122b. In the illustrated example, the demographics data 122a, 122b associated with the households 110a, 110b of the target region 102 are collected via a survey-based census (e.g. a government-funded census, a privately-funded census).

As illustrated in FIG. 1, the households 112a, 112b (e.g., panelist households) of the source region 104 (e.g., a panelist region) include respective members 124a, 124b, 124c (e.g., panelists), media presentation devices 126a, 126b, and meters 128a, 128b (e.g., people meters). For example, the household 112a includes the members 124a, 124b, the media presentation device 126a, and the meter 128a, and the household 112b includes the member 124c, the media presentation device 126b, and the meter 128b.

In some examples, the households 112a, 112b are representative of many other households (e.g., other panelist households) that may be included in the example source region 104. Characteristics of the other households (e.g., a number of household members, demographics of the household members, a number of televisions, etc.) may be similar to and/or different from those of the representative households 112a, 112b. For example, other households include one member, two members, three members, four members, etc.

The meters 128a, 128b of the illustrated example are electronic devices that are positioned in media access areas (e.g., exposure areas such as living rooms of the households 112a, 112b) proximate to the respective media presentation devices 126a, 126b to monitor the media presented via the respective media presentation devices 126a, 126b and/or the media exposed to the members 124a, 124b, 124c. That is, the example meters 128a, 128b of the source region 104 collect exposure data 130a, 130b, 130c that identifies whether the corresponding members 124a, 124b, 124c were exposed to displayed media, while the STBs 118a, 118b of the target region 102 collect the tuning data 120a, 120b that identifies tuning events of the STBs 118a, 118b and/or the media presentation devices 116a, 116b but do not identify whether a member is exposed to the tuned event). Additionally or alternatively, the example panelists 124a, 124b, 124c may carry corresponding personal people meters (e.g., electronic devices designated to the members 124a, 124b, 124c) that monitor the media exposed to those corresponding members 124a, 124b, 124c.

In the illustrated example, the media presentation devices 126a, 126b are televisions. In alternative examples, the media presentation devices 126a, 126b are computers (e.g., desktop computers, laptop computers, etc.), speakers, stereos, portable devices (e.g., tablets, smartphones, etc.), gaming consoles (e.g., Xbox Ones®, Playstation® 4s, etc.), online media presentation devices (e.g., Google Chromecasts, Rokus® Streaming Sticks®, Apple TVs®, etc.) and/or any other type of media presentation devices.

As illustrated in FIG. 1, the example exposure data 130a, 130b, 130c (e.g., behavioral data) and demographics data 132a, 132b, 132c are collected from the respective households 112a, 112b of the source region 104. The example exposure data 130a, 130b, 130c are associated with media events exposed (e.g., exposure events) to the respective members 124a, 124b, 124c of the source region 104. The example exposure data 130a, 130b, 130c identify programs (e.g., Family Matters, Chicago PD, Sirens, According to Jim, The League, etc.), channels (CBS, NBC, ABC, TV Land, USA Network, FXX, etc.), and/or times (e.g., particular times such as 7:10 A.M. or 8:31 P.M., predetermined time-period segments such as 7:00-7:15 A.M. or 8:00-8:30 P.M., etc.) associated with the exposure events. The example exposure data 130a, 130b, 130c identify which member(s) (e.g., the example members 124a, 124b, 124c) are associated with the exposure events. Further, the example exposure data 130a, 130b, 130c may be associated with the corresponding demographics data (e.g., the demographics data 132a, 132b, 132c) of the identified members. As an example, if the member 124a is exposed to the show "Married . . . With Children," the exposure data 130a identifies the program (i.e., the show "Married . . . With Children"), the channel (TBS), the time (e.g., 8:30 A.M. on Thursday) and/or the member (i.e., the member 124a) associated with the exposure event and is associated with the corresponding demographics data (e.g., the demographics data 130a) of the member.

In the illustrated example, the demographics data 132a includes person-specific information associated with the member 124a, the demographics data 132b includes person-specific information associated with the member 124b, and the demographics data 132c includes person-specific information associated with the member 124c. The demographics data 132a, 132b, 132c of the illustrated example identify which demographic constraints (e.g., demographic marginals of respective demographic dimensions, combinations of demographic marginals of combinations of respective demographic dimensions, etc.) are associated with the corresponding members 124a, 124b, 124c of the source region 104. For example, the demographics data 132a indicate that the member 124a satisfies the "white, middle-aged, male" demographic constraint, the demographics data 132b indicate that the member 124b satisfies the "black, middle-aged, female" demographic constraint, and the demographics data 132c indicate that the member 124c satisfies the "Latino, young, female" demographic constraint. The demographics data 132a, 132b, 132c may be provided by the members 124a, 124b, 124c via, for example, self-reporting, responding to surveys, providing consent for entities (e.g., AMEs) to obtain such information from database proprietors (e.g., Facebook, Twitter, Google, Yahoo!, MSN, Apple, Experian, etc.), etc. In some examples, the demographics data 132a, 132b, 132c are collected from the members 124a, 124b, 124c upon and/or after the members 124a, 124b, 124c are enlisted as panelists.

From time to time (periodically, aperiodically, randomly, when data capacity is reached, etc.), the STBs 118a, 118b communicate the collected tuning data 120a, 120b of the target region 102 and the meters 128a, 128b communicate the collected exposure data 130a, 130b, 130c of the source region 104 to the AME 106 via the network 108 (e.g., the Internet, a local area network, a wide area network, a cellular network, etc.) via wired and/or wireless connections (e.g., a cable/DSL/satellite modem, a cell tower, etc.).

The AME 106 of the illustrated example utilizes the collected demographics data 122a, 122b and the collected tuning data 120a, 120b of the target region 102 (e.g., a non-panelist region) and the collected demographics data 132a, 132b, 132c and the collected exposure data 130a, 130b, 130c of the source region 104 (e.g., a panelist region) to utilize minimum cross entropy to determine granular data of the target region 102. In the illustrated example, the example AME 106 (e.g., The Nielsen Company (US), LLC®) utilizes the minimum cross entropy to calculate the granular data of the target region 102 to produce media ratings (e.g., a composition and/or size of a media audience) for the target region. The ratings produced by the example AME 106 may be used by advertisers and/or marketers to purchase advertising space and/or design advertising campaigns. Additionally or alternatively, the ratings produced by the example AME 106 are used by media producers and/or distributors to determine how to set prices for advertising space and/or make programming decisions.

As illustrated in FIG. 1, the AME 106 includes a target region demographics database 134, a target region behavioral database 136, a source region database 138, and a demographics estimator 140.

The target region demographics database 134 of the illustrated example stores the demographics data (e.g., the demographics data 122a, 122b) of the target region 102 in a non-person-specific, non-household-specific aggregate form. That is, the example target region demographics database 134 stores aggregate demographics data of the target region 102 that indicates count(s) and/or percentage(s) of members of the target region 102 satisfying demographic constraint(s) of interest (e.g., a "young female" demographic constraint, an "old female" demographic constraint, a "young male" demographic constraint, an "old male" demographic constraint, etc.) without identifying which members (e.g., the members 114a, 114b, 114c) and/or households (e.g., the households 110a, 110b) are associated with those demographic constraints.

The target region behavioral database 136 of the illustrated example stores the behavioral data (e.g., the tuning data 120a, 120b) of the target region 102 in a non-person-specific, non-household-specific aggregate form. That is, the example target region behavioral database 134 stores aggregate behavioral data of the target region 102 that indicates count(s) and/or percentage(s) of members of the target region 102 satisfying behavioral constraint(s) of interest (a behavioral constraint for the show "Shameless," a behavioral constraint for the show "Chicago Fire," a behavioral constraint for the show "The Good Wife," etc.) without identifying which members (e.g., the members 114a, 114b, 114c) and/or households (e.g., the households 110a, 110b) are associated with those behavioral constraints.

The source region database 138 of the illustrated example stores the demographics data (e.g., the demographics data 132a, 132b, 132c) and the behavioral data (e.g., the exposure data 130a, 130b, 130c) of the source region 104 in granular form. That is, the example source region database 138 stores granular data of the source region 104 that indicates count(s) and/or percentage(s) of members of the target region 104 satisfying behavioral constraint(s) of interest (a behavioral constraint for the show "Shameless," a behavioral constraint for the show "Chicago Fire," a behavioral constraint for the show "The Good Wife," etc.) that also satisfy demographic constraint(s) of interest (e.g., a "young female" demographic constraint, an "old female" demographic constraint, a "young male" demographic constraint, an "old male" demographic constraint, etc.).

Based on the aggregate demographics data of the target region demographics database 134, the aggregate behavioral data of the target region behavioral database 136, and the granular data of source region database 138, the demographics estimator 140 of the illustrated example performs non-linear optimization to utilize minimum cross entropy to determine granular data of the target region 102. For example, based on aggregate data of the target region 102 and granular data of the source region 104 (e.g., a panelist region), the demographics estimator 140 utilizes the minimum cross entropy to calculate granular data of the target region 102 (e.g., a non-panelist region) to measure a size and/or composition of media audiences in the target region 102.

In operation, non-person-specific demographics data (e.g., the demographics data 122a, 122b) and non-person-specific behavioral data (e.g., the tuning data 120a, 120b)

are collected from households (e.g., the households 110a, 110b) of a non-panelist region (e.g., the target region 102). Further, person-specific demographics data (e.g., the demographics data 132a, 132b, 132c) and person-specific behavioral data (e.g., the exposure data 130a, 130b, 130c) are collected from households (e.g., the households 112a, 112b) of a panelist region (e.g., the source region 104). The collected demographics and behavioral data are sent to the AME 106 via the network 108. The target region demographics database 134 of the AME 106 stores the demographics data of the non-panelist region in aggregate form, the target region behavioral database 136 stores the behavioral data of the non-panelist region in aggregate form, and the source region database 138 stores the demographics and behavioral data of the panelist region 104 in granular form. Based on the aggregate data of the non-panelist region and the granular data of the panelist region, the demographics estimator 140 utilizes the minimum cross entropy to determine granular data of the non-panelist region that may be used to measure media audiences of the non-panelist region.

The example methods and apparatus disclosed herein utilize minimum cross entropy to determine granular data of a target region based on aggregate data of the target region and granular data of another region (e.g., a source region) to, for example, address the technological problem of reducing an amount of data that is collected from the target region by computer networked data collection systems to determine the granular data of the target region. Further, by utilizing the minimum cross entropy to calculate the granular data of the target region based on, in part, the aggregate data of the target region, the disclosed example methods and apparatus provide a solution to the technological problem of determining the granular data of the target region based on non-person-specific aggregate tuning data (e.g., tuning data not associated with demographics data) that is collected from the target region by computer networked data collection systems.

Figure 2:
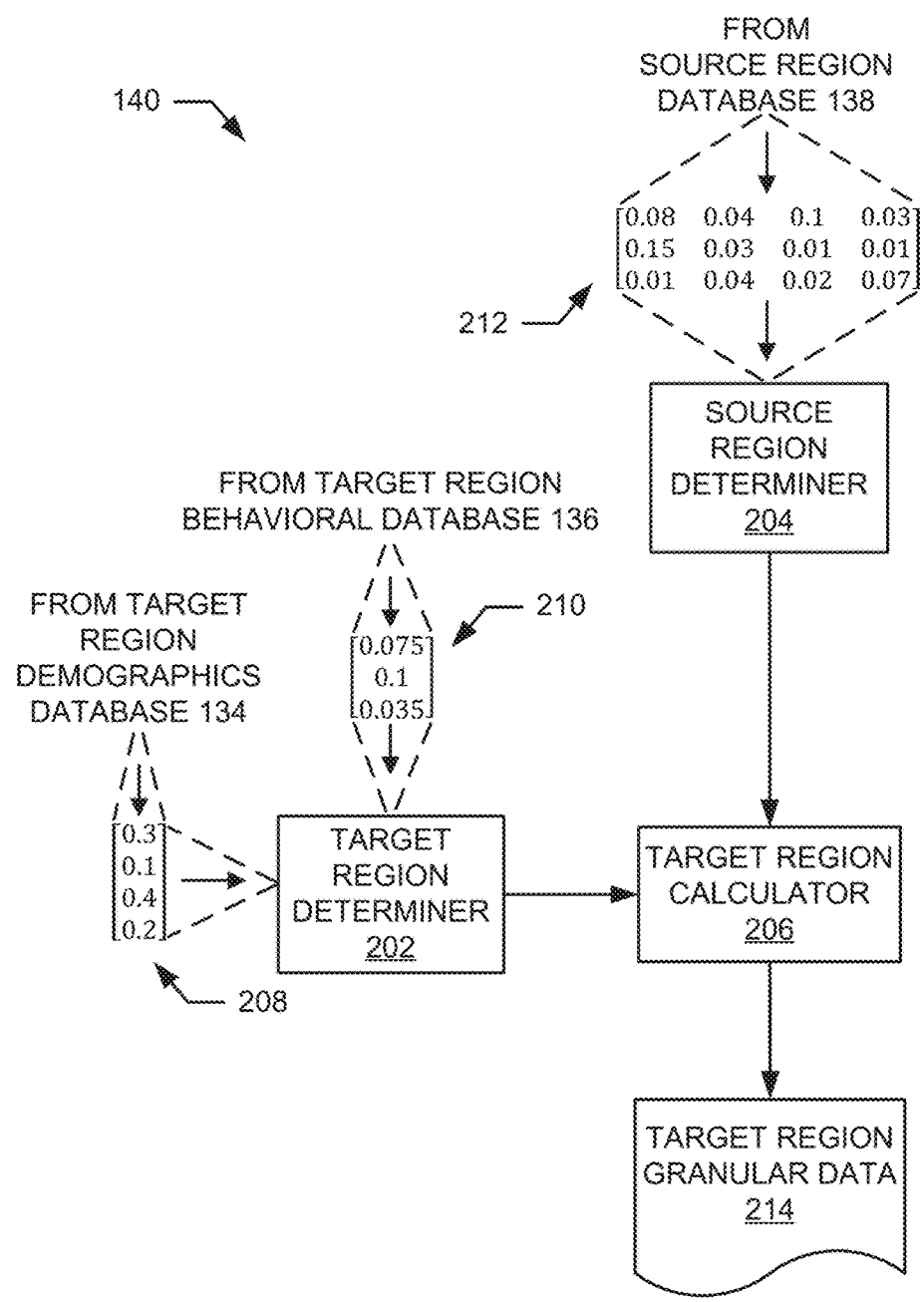
FIG. 2 is a block diagram of an example implementation of the demographics estimator of FIG. 1 that is to utilize the minimum cross entropy to calculate granular data of the target region of FIG. 1.

FIG. 2 is a block diagram of an example implementation of the example demographics estimator 140 of FIG. 1 that is to utilize minimum cross entropy to determine granular data of the example target region 102 of FIG. 1. As illustrated in FIG. 2, the example demographics estimator 140 includes an example target region determiner 202, an example source region determiner 204, and an example target region calculator 206.

The target region determiner 202 of the illustrated example determines aggregate demographics data 208 of the example target region 102. For example, the target region determiner 202 collects the aggregate demographics data 208 that is based on the example demographics data 122a, 122b of the example households 110a, 110b (e.g., non-panelist households) of the target region 102 (e.g., a non-panelist region) from the example target region demographics database 134 of FIG. 1. For example, the aggregate demographics data 208 collected by the target region determiner 202 includes non-person-specific and non-household-specific data collected via a survey-based census (e.g. a government-funded census, a privately-funded census). In some examples, the target region determiner 202 obtains the aggregate demographics data 208 from the target region demographics database 134 via a network (e.g., the Internet, a local area network, a wide area network, a cellular network, etc.) and wired and/or wireless connections (e.g., a cable/DSL/satellite modem, a cell tower, etc.).

As illustrated in FIG. 2, the example target region determiner 202 collects the example aggregate demographics data 208 in vector form. Elements of the example aggregate demographics data 208 correspond to demographic constraints of interest. For example, an element of a first row of the example aggregate demographics data 208 corresponds with a "young female" demographic constraint, an element of a second row corresponds with an "old female" demographic constraint, an element of a third row corresponds with a "young male" demographic constraint, and an element of a fourth row corresponds with an "old male" demographic constraint. Additionally or alternatively, the example aggregate demographics data 208 may include elements that correspond to demographic constraints associated with other demographic marginals (e.g., income, race, nationality, geographic location, education level, religion, etc.), demographic joint-marginals (e.g., a gender/race/income demographic joint-marginal), demographic joints (e.g., a gender/race/income/education-level demographic joint), and/or any combination thereof.

The elements of the example aggregate demographics data 208 represent quantities (e.g., counts, percentages) of the target region 102 that match, belong to and/or satisfy the corresponding demographics of interest. As illustrated in FIG. 2, the elements of the example aggregate demographics data 208 are normalized to a value of '1.0' such that the sum of the elements of the aggregate demographics data 208 equals a value of '1.0.' For example, the element of the first row of the example aggregate demographics data 208 includes a value of '0.3' that indicates 30% of members of the target region 102 are young females, the element of the second row includes a value of '0.1' that indicates 10% of members of the target region 102 are old females, the element of the third row includes a value of '0.4' that indicates 40% of members of the target region 102 are young males, and the element of the fourth row includes a value of '0.2' that indicates 20% of members of the target region 102 are old males.

Further, the example target region determiner 202 determines aggregate tuning data 210 (e.g., aggregate behavioral data) of the example target region 102. For example, the target region determiner 202 collects the aggregate tuning data 210 that is based on the example non-person-specific tuning data 120a, 120b of the example households 110a, 110b (e.g., the non-panelist households) of the first region 102 (e.g., the non-panelist region) from the example target region behavioral database 136 of FIG. 1. In some examples, the target region determiner 202 obtains the aggregate tuning data 210 from the target region behavioral database 136 via a network (e.g., the Internet, a local area network, a wide area network, a cellular network, etc.) and wired and/or wireless connections (e.g., a cable/DSL/satellite modem, a cell tower, etc.).

As illustrated in FIG. 2, the example target region determiner 202 collects the example aggregate tuning data 210 in vector form. Elements of the example aggregate tuning data 210 correspond to behavioral constraints (e.g., tuning events) of interest. For example, an element of a first row of the example aggregate tuning data 210 corresponds with a behavioral constraint for the show "Shameless," an element of a second row corresponds with a behavioral constraint for the show "Chicago Fire," and an element of a third row corresponds with a behavioral constraint for the show "The Good Wife." Additionally or alternatively, the example aggregate demographics data 208 may include elements that correspond to other behavioral constraints (e.g., tuning durations, channels tuned, tuning times, etc.). Alternatively, the behavioral constraints of interest correspond to elements of columns of a vector form of the aggregate tuning data 210.

The elements of the example aggregate tuning data 210 represent quantities (e.g., counts, percentages, ratings points, ratings shares, etc.) of households of the target region 102 (e.g., the households 110a, 110b) that match, belong to and/or satisfy the corresponding behavioral characteristics (e.g., tuning events) of interest. For example, a value of '0.075' in the first row of the example aggregate tuning data 212 indicates that 7.5% of the households of the target region 102 (e.g., the example households 110a, 110b of FIG. 1) tuned to a first program (e.g., "Shameless"), a value of '0.01' in the second row indicates that 10% of the households were tuned to a second program (e.g., "Chicago Fire"), and a value of '0.035' in the third row indicates that 3.5% of the households were tuned to a third program (e.g., "The Good Wife").

The source region determiner 204 of the illustrated example determiners granular data 212 of the example source region 104 of FIG. 1. For example, the source region determiner 204 collects the granular data 212 that is based on exposure data (e.g., the example exposure data 130a, 130b, 130c of FIG. 1) and demographics data (e.g., the example demographics data 132a, 132b, 132c of FIG. 1) of panelist households (e.g., the example households 112a, 112b of FIG. 1) of the source region 104 (e.g., a panelist region) from the example source region database 138 of FIG. 1. In some examples, the source region determiner 204 obtains the granular data 212 from the source region database 138 via a network (e.g., the Internet, a local area network, a wide area network, a cellular network, etc.) and wired and/or wireless connections (e.g., a cable/DSL/satellite modem, a cell tower, etc.).

As illustrated in FIG. 2, the example source region determiner 204 collects the example granular data 212 in matrix form. In the illustrated example, rows of the granular data 212 collected by the source region determiner 204 correspond to behavioral constraints of interest, and columns of the granular data 212 correspond to demographic constraints of interest. The behavioral constraints corresponding to the rows of the example granular data 212 are the same behavioral constraints of the example aggregate tuning data 210. For example, a first row of the granular data 212 collected by the example source region determiner 204 corresponds with a behavioral constraint for the show "Shameless," a second row corresponds with a behavioral constraint for the show "Chicago Fire," and a third row corresponds with a behavioral constraint for the show "The Good Wife." Further, the demographic constraints corresponding to the columns of the example granular data 212 are the same demographic constraints of the example aggregate demographics data 208. For example, a first column of the granular data 212 collected by the example source region determiner 204 corresponds with a "young female" demographic constraint, a second column corresponds with an "old female" demographic constraint, a third column corresponds with a "young male" demographic constraint, and a fourth column corresponds with an "old male" demographic constraint.

Elements of the granular data 212 collected by the source region determiner 204 represent values indicative of quantities (e.g., counts, percentages, ratings points, ratings shares, etc.) of members of the source region 104 matching, satisfying, and/or belonging to the corresponding behavioral constraint that also match, satisfy, and/or belong to the corresponding demographic constraint. For example, a value of '0.08' in the first row and the first column of the example granular data 212 indicates that 8% of young females of the source region 104 were exposed to the show "Shameless."

Similarly, a value of '0.04' in the first row and the second column indicates that 4% of old females were exposed to the show "Shameless," a value of '0.1' in the first row and the third column indicates that 10% of young males were exposed to the show "Shameless," and a value of '0.03' in the first row and the fourth column indicates that 3% of old males were exposed to the show "Shameless." Further, as illustrated in the example granular data 212 of FIG. 2, a value of '0.15' in the second row and the first column indicates that 15% of young females were exposed to the show "Chicago Fire," and a value of '0.01' in the third row and the first column indicates that 1% of young females were exposed to the show "The Good Wife."

In the illustrated example, the target region calculator 206 utilizes minimum cross entropy to determine or calculate target region granular data 214. The minimum cross entropy may be utilized to perform non-linear optimization on multiple probability distributions (e.g., aggregate demographics data, aggregate behavioral data, granular aggregate and demographics data, etc.) that relate to overlapping sets of characteristics (e.g., shared behavioral characteristics and/or demographic characteristics). For example, the target region calculator 206 utilizes the minimum cross entropy to calculate the granular data 214 of the target region 102 based on the aggregate demographics data 208 and the aggregate behavioral data 210 of the target region 102 and the granular data 212 of the source region 104. The target region granular data 214 calculated by the target region calculator 206 via the minimum cross entropy includes estimates of quantities (e.g., counts, percentages, ratings points, ratings shares, etc.) of members of the target region 102 matching, satisfying, and/or belonging to behavioral constraints of interest that also match, satisfy, and/or belong to demographic constraints of interest.

The target region calculator 206 utilizes the minimum cross entropy to calculate the target region granular data 214 to reduce variability of small values (e.g. values near, close to and/or approximate '0.0' or 0%) and/or large values (e.g., values near, close to and/or approximate '1.00' or 100%) of the target region granular data 214 relative to those corresponding values of the granular data 212 of the source region 104 to increase accuracy and/or certainty of the calculated target region granular data 214. For example, the minimum cross entropy utilized by the target region calculator 206 allows for a greater difference of intermediate values (e.g., values away from '0.0' or 0% and '1.00' and 100%, values more approximate to '0.50' or 50% compared to the small and/or large values) to reduce an amount of difference of the small values of the target region granular data 214, because a difference of a particular value (e.g., +/−'0.02' or 2%) increases a variability of a small values (e.g., '0.03' or 3%) more than it increases a variability of an intermediate value (e.g., '0.2' or 20%). In some examples, because the minimum cross entropy reduces variability of small values of the target region granular data 214, the target region calculator 206 determines whether to utilize the minimum cross entropy upon identifying that the target region granular data 214 is based on data (the aggregate demographics data 208 of the target region 102, the aggregate behavioral data 210 of the target region 102, and/or the granular data 212 of the source region 104) in which there is a high degree of confidence (e.g., as a result of a large sample size, a small margin of error, and/or other factors indicating confidence).

The example target region calculator 206 utilizes minimum cross entropy for each of the behavioral constraints on interest to determine the granular data 214 of the target region 102. For example, the target region calculator 206 utilizes minimum cross entropy for the constraint associated with the show "Shameless," again utilizes minimum cross entropy for the constraint associated with the show "Chicago Fire," and again utilizes minimum cross entropy for the constraint associated with the show "The Good Wife." The minimum cross entropies are utilized to calculate the granular data 214 of the respective behavioral constraints by minimizing Equation 1 provided below.

$$D(P:Q) = -\sum_{i=1}^{n} p_i \log\left(\frac{p_i}{q_i}\right) - \sum_{i=1}^{n} (1-p_i)\log\left(\frac{1-p_i}{1-q_i}\right) \quad \text{Equation 1}$$

In Equation 1 provided above, P represents the granular data 214 of the target region 102 to be determined, Q represents the granular data 212 of the source region 104 determined by the source region determiner 204, $p_i$ represents the target region granular data 214 of the behavioral constraint i to be calculated (e.g., in decimal form such that $p_i$ equals a value of '0.1' when 10% of a population is tuned to a particular program), and $q_i$ represents the granular data 212 of the behavioral constraint i (e.g., in decimal form such that $q_i$ equals a value of '0.075' when 7.5% of a population is tuned to a particular program) that is determined by the source region determiner 204.

To enable the non-linear optimization to be performed via the minimum cross entropy, Equation 1 may be solved via a partial derivative of the Lagrangian (e.g., Equation 1 is solved given that the right-hand side of partial the derivative of the Lagrangian of Equation 1 equals a value of '0'). An example of the solution of Equation 1 is provided below in Equation 2.

$$\frac{p_i}{1-p_i} = \frac{q_i}{1-q_i} e^{-\lambda w_i} \quad \text{Equation 2}$$

In Equation 2 provided above, $p_i$ represents the target region granular data 214 of the behavioral constraint i (e.g., in decimal form), $q_i$ represents the granular data 212 of the behavioral constraint i (e.g., in decimal form) that is determined by the source region determiner 204, and $w_i$ represents the aggregate demographics data 208 associated with the behavioral constraint i (e.g., in decimal form) determined by the target region determiner 202. For example, $p_1$ represents a probability associated with a first behavioral constraint (e.g., tuning to the show "Shameless") of the target region granular data 214, $p_2$ represents a probability value associated with a second behavioral constraint (e.g., tuning to the show "Chicago Fire") of the target region granular data 214, $p_3$ represents a probability associated with a third behavioral constraint (e.g., tuning to the show "The Good Wife") value of the target region granular data 214, etc. The example target region calculator 206 utilizes the minimum cross entropy via the above-provided Equation 2 by solving for λ.

The relationships of equations 1 and 2 are constructed such that each calculated value, $p_i$, is a positive value between '0.0' and '1.0' (e.g., between 0% and 100% if written in percentage form). That is, the relationships of equations 1 and 2 are constructed such that $0 \leq p_i \leq 1.0$ for each value of the target region granular data 214.

Further, the example target region calculator 206 performs non-linear optimization (e.g., utilizes minimum cross entropy) of the above-provided Equation 1 subject to an equality constraint represented as Pw=C in which P represents the granular data 214 of the target region 102 to be determined, w represents the aggregate demographics data 208 of the target region 102 determined by the target region determiner 202, and C represents the aggregate tuning data 210 of the target region 102 determined by the target region determiner 202. For example, P of the equality constraint includes $p_1$, $p_2$, $p_3$, and/or any other values of the target region granular data 214 (e.g., $p_i$) of Equation 2 provided above. In some examples, the target region calculator 206 utilizes minimum cross entropy to calculate values that approach, are approximate to, and/or equal minimum cross entropy probabilities associated with the behavioral constraints of the target region granular data 214. Thus, the target region calculator 206 utilizes minimum cross entropy to determine the target region granular data 214 based on the example aggregate demographics data 208 (e.g., w of the above-identified equality constraint and/or $w_i$ of Equations 1 and 2), the example aggregate tuning data 210 (e.g., C of the above-identified equality constraint), and the example granular data 214 of the source region 104 (e.g., P of the above-identified equality constraint and/or $p_i$ of Equations 1 and 2).

In the illustrated example, the target region calculator 206 utilizes the minimum cross entropy to calculate the target region granular data 214 as shown in the example below in Table 1.

TABLE 1

|  | Young Female | Old Female | Young Male | Old Male |
| --- | --- | --- | --- | --- |
| Shameless | 0.081 | 0.0402 | 0.1016 | 0.0303 |
| Chicago Fire | 0.2736 | 0.0383 | 0.027 | 0.0165 |
| The Good Wife | 0.0126 | 0.0431 | 0.027 | 0.0807 |

The values of the example granular data 214 of the target region 102 provided above in Table 1 represent quantities (e.g., counts, percentages, etc.) of members of the target region 102 satisfying corresponding demographic constraints of interest that also satisfy corresponding behavioral constraints of interest. For example, as provided above in Table 1, the example granular data 214 calculated by the example target region calculator 206 includes a value of '0.081' that indicates 8.10% of young females of the example target region 102 were tuned to the show "Shameless." As illustrated in example Table 1 provided above, the target region calculator 206 utilizes the minimum cross entropy to reduce variability of small values (e.g., values near, close to and/or approximate '0.0' or 0%) of the target region granular data 214 relative to the corresponding values of the granular data 212 of the source region 104 to increase accuracy and/or certainty of those values of the target region granular data 214. For example, the values of the target region granular data 214 of Table 1 for the show "Chicago Fire" and old females (e.g., '0.0383'), young males (e.g., '0.027'), and old males (e.g., '0.0165') are approximate to the respective values of the granular data 212 of the source region 104 (e.g., '0.03' for old females, '0.01' for young males, '0.01' for old males as illustrated in FIG. 2).

The example demographics estimator 140 of FIGS. 1 and/or 2 enables the example AME 106 or other entity to determine the granular data 214 of the example target region 102 by utilizing the minimum cross entropy based on the example aggregate demographics data 208 and the example aggregate tuning data 210 of the target region 102, thereby reducing an amount of data collected from the target region 102 by computer networked data collection systems. For example, the demographics estimator 140 enables the example AME 106 or other entity to utilize the minimum cross entropy to determine the granular data 214 of the example target region 102 based on non-person-specific tuning data collected from STBs (e.g., the example STBs 118a, 118b of FIG. 1) of the target region 102 and non-person-specific and non-household-specific census data without having to collect person-specific demographics and behavioral data from panelists of the target region.

While an example manner of implementing the demographics estimator 140 of FIG. 1 is illustrated in FIG. 2, one or more of the elements, processes and/or devices illustrated in FIG. 2 may be combined, divided, re-arranged, omitted, eliminated and/or implemented in any other way. Further, the example target region determiner 202, the example source region determiner 204, the example target region calculator 206 and/or, more generally, the example demographics estimator 140 of FIG. 1 may be implemented by hardware, software, firmware and/or any combination of hardware, software and/or firmware. Thus, for example, any of the example target region determiner 202, the example source region determiner 204, the example target region calculator 206 and/or, more generally, the example demographics estimator 140 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example target region determiner 202, the example source region determiner 204, the example target region calculator 206 and/or, the example demographics estimator 140 is/are hereby expressly defined to include a tangible computer readable storage device or storage disk such as a memory, a digital versatile disk (DVD), a compact disk (CD), a Blu-ray disk, etc. storing the software and/or firmware. Further still, the example demographics estimator 140 of FIG. 1 may include one or more elements, processes and/or devices in addition to, or instead of, those illustrated in FIG. 2, and/or may include more than one of any or all of the illustrated elements, processes and devices.

Figure 3:
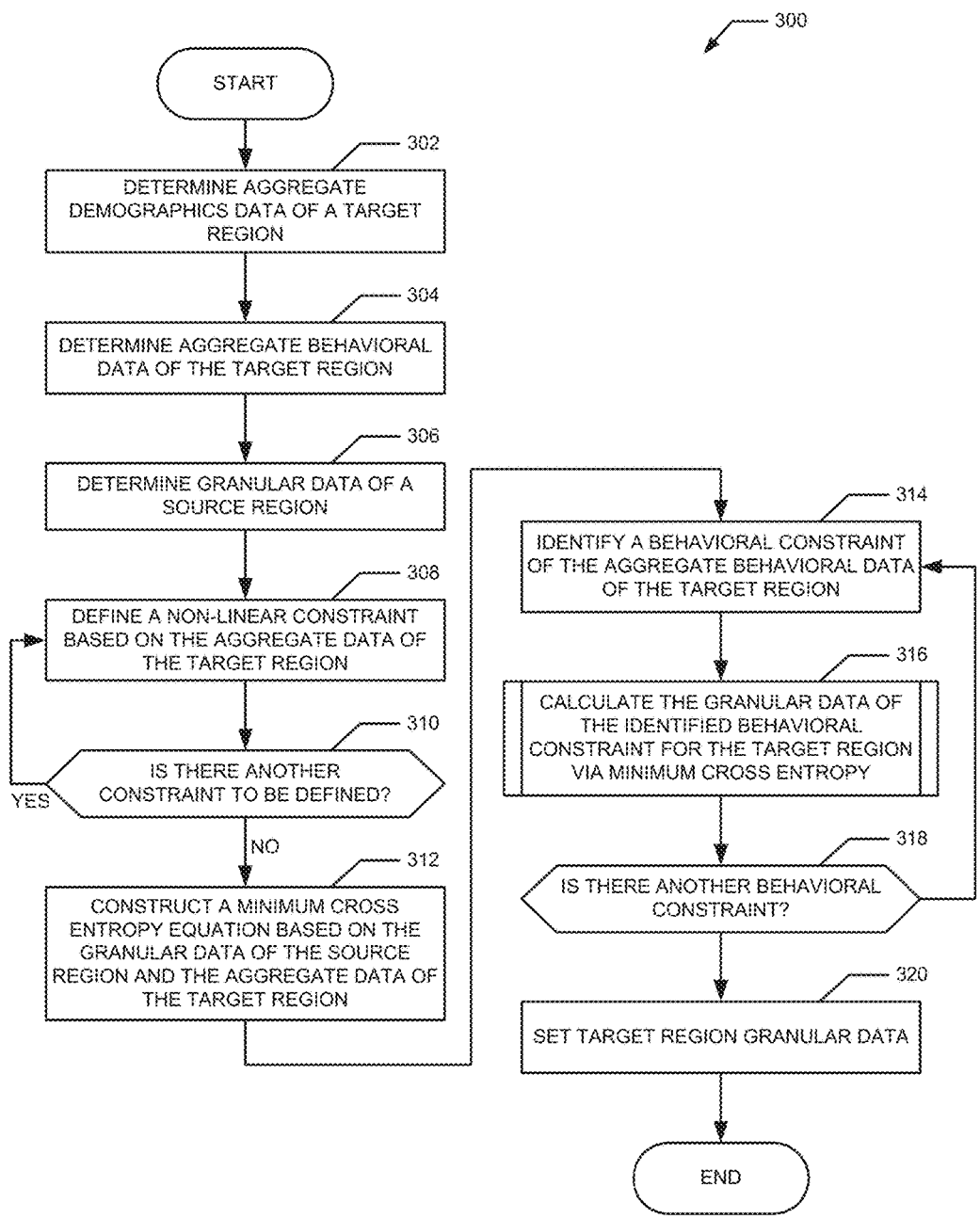
FIG. 3 is a flow diagram representative of example machine readable instructions that may be executed to implement the example demographics estimator of FIGS. 1 and/or 2 to determine the granular data of the target region of FIG. 1.
Figure 4:
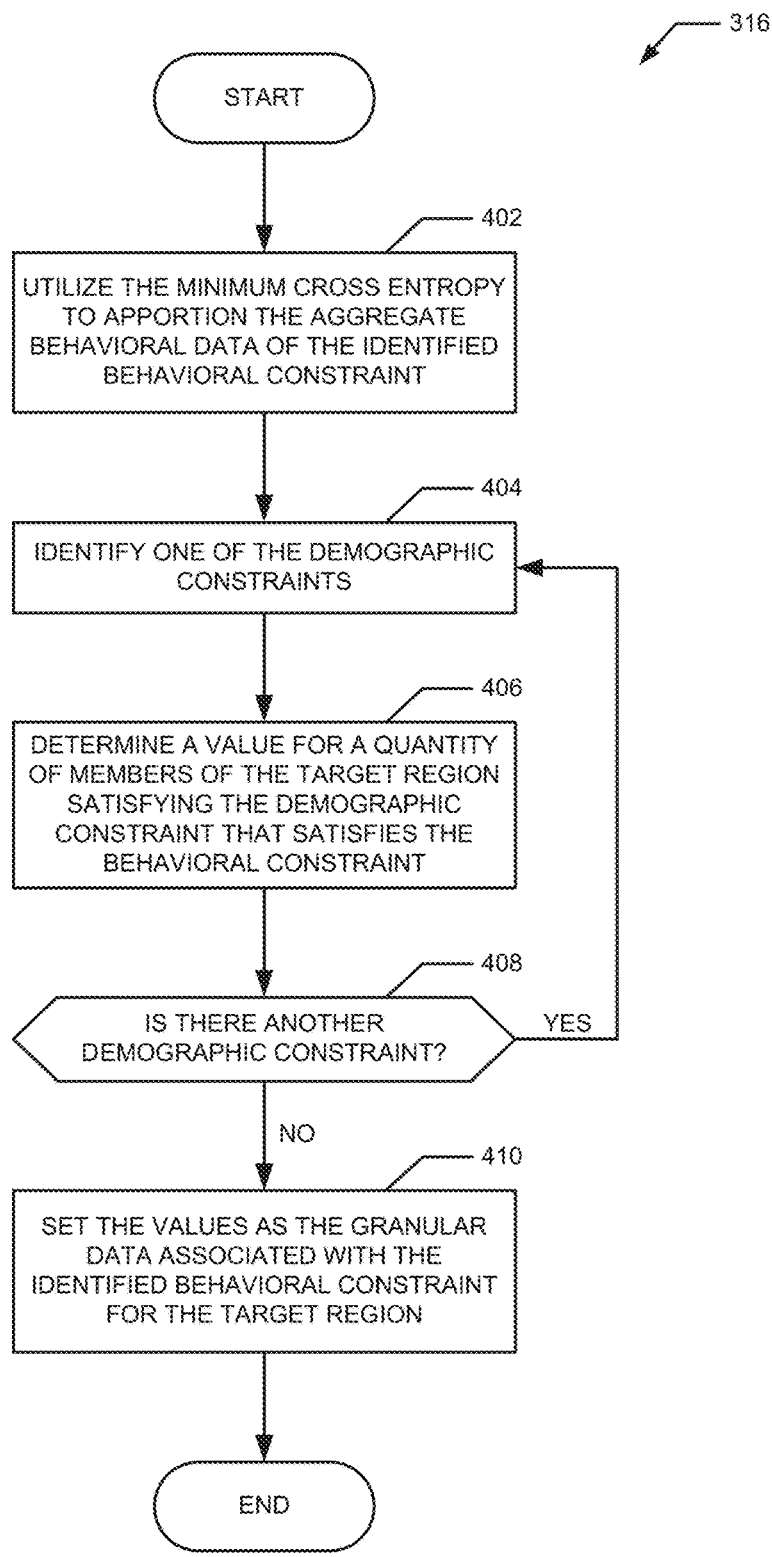
FIG. 4 is a flow diagram representative of example machine readable instructions that may be executed to implement the example target region calculator of FIG. 2 to determine the granular data of the target region of FIG. 1.

A flowchart representative of example machine readable instructions for implementing the demographics estimator 140 of FIG. 1 is shown in FIG. 3. A flowchart representative of example machine readable instructions for implementing the target region calculator 206 of FIG. 2 is shown in FIG. 4. In this example, the machine readable instructions comprise a program for execution by a processor such as the processor 912 shown in the example processor platform 900 discussed below in connection with FIG. 9. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 3 and 4, many other methods of implementing the example demographics estimator 140 may alternatively be used. For example, the order of execution of the blocks may be changed, and/or some of the blocks described may be changed, eliminated, or combined.

As mentioned above, the example processes of FIGS. 3 and 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3 and 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flow diagram representative of example machine readable instructions 300 that may be executed to implement the example demographics estimator 140 of FIGS. 1 and/or 2 to utilize the minimum cross entropy to determine the granular data 214 of the target region 102 of FIG. 1. Initially, at block 302, the example target region determiner 202 determines the example aggregate demographics data 208 of the example target region 102. For example, the aggregate demographics data 208 determined by the target region determiner 202 is in vector form in which elements represent values indicative of quantities (e.g., counts, percentages) of the members (e.g., the example members 114a, 114b, 114c of FIG. 1) of the target region 102 that are associated with demographic constraints of interest (e.g., a "young female" constraint, an "old female" constraint, a "young male" constraint, an "old male" constraint). For example, the aggregate demographics data 208 determined by the example aggregate demographics data 208 is normalized to a value of '1.0' such that the sum of the elements of the aggregate demographics data 210 equals a value of '1.0.'

At block 304, the example target region determiner 202 determines the aggregate tuning data 210 (e.g., aggregate behavioral data) of the target region 102. The example target region determiner 202 determines the example aggregate tuning data 210 in vector form in which elements represent values indicative of quantities (e.g., counts, percentages) of the households (e.g., the example households 110a, 110b of FIG. 1) of the target region 102 that are associated with behavioral constraints (e.g., tuning events) of interest (e.g., a constraint for the show "Shameless," a constraint for the show "Chicago Fire," a constraint for the show "The Good Wife").

At block 306, the example source region determiner 204 determines the example granular data 212 of the example source region 104. The example source region determiner 204 determines the example granular data 212 in matrix form such that rows correspond to behavioral constraints of interest, columns correspond to demographic constraints of interest, and elements represent values indicative of quantities (e.g., counts, percentages, ratings points, ratings shares, etc.) of members of the source region 104 satisfying the corresponding behavioral constraints that also satisfy the corresponding demographic constraints. For example, the granular data 212 determined by the source region determiner 204 includes data for the same demographic constraints as the example aggregate demographics data 208 and the same behavioral constraints as the example aggregate tuning data 210.

At block 308, the example target region calculator 206 defines a non-linear constraint (e.g., an optimization constraint). The example target region calculator 206 defines a non-linear constraint based on the example aggregate demographics data 208 and/or the example aggregate tuning data 210 determined at blocks 302, 304, respectively, of FIG. 3. For example, the target region calculator 206 defines a non-linear constraint as provided below in Equation 3.

$$Pw = C \qquad \text{Equation 3}$$

In Equation 3 provided above, P represents the granular data 214 of the target region 102 to be calculated (e.g., P includes $p_1$, $p_2$, $p_3$, etc.), w represents the aggregate demographics data 208 of the target region 102, and C represents the aggregate tuning data 210 of the target region 102.

Further, the example target region calculator 206 determines whether there is another non-linear constraint (e.g., another optimization constraint) to be defined (block 310). If there is another non-linear constraint, the target region calculator 206 repeats blocks 308, 310 until no other non-linear constraints remain to be defined. Upon determining the non-linear constraints, the example target region calculator 206 constructs a minimum cross entropy relationship based on the granular data 212 of the source region 104 and the aggregate demographics data 208 of the target region 102. The target region calculator 206 constructs the minimum cross entropy relationship as provided below in Equation 4.

$$\frac{p_i}{1 - p_i} = \frac{q_i}{1 - q_i} e^{-\lambda w_i} \qquad \text{Equation 4}$$

In Equation 4 provided above, $p_i$ represents the target region granular data 214 of the behavioral constraint i (e.g., in which a percentage of a population of the target region 102 is represented in decimal form), $q_i$ represents the granular data 212 of the behavioral constraint i (e.g., in which a percentage of a population of the source region 104 is represented in decimal form), and $w_i$ represents the aggregate demographics data 208 associated with the behavioral constraint i (e.g., in which a percentage of a population of the target region 102 is represented in decimal form). The relationship of equation 4 is constructed such that each value of $p_i$ will be a positive value between '0.0' and '1.0' (e.g., between 0% and 100% if represented as a percentage). That is, the relationship of equation 4 is constructed such that $0 \leq p_i \leq 1.0$.

At block 314, the example target region calculator 206 identifies a behavioral constraint (e.g., a constraint associated with a tuning event) of the aggregate tuning data 210 and the granular data 212. For example, the target region calculator 206 identifies a behavioral constraint (e.g., the constraint for the show "Shameless") associated with the first row of the aggregate tuning data 210 and the first row of the granular data 212.

At block 316, the example target region calculator 206 calculates or determines the granular data 214 of the target region 102 for the behavioral constraint identified at block 314 via minimum cross entropy. The example target region calculator 206 determines portions (e.g., counts, percentages) of members of the example target region 102 satisfying the identified behavioral constraint that also satisfy the corresponding demographic constraints associated with the example aggregate demographics data 208 and the granular data 212 of the source region 104. For example, the target region calculator 206 determines that 8.10% of young females, 4.02% of old females, 10.16% of young males, and 3.03% of old males of the example target region 102 were exposed to the show "Shameless."

Upon the example target region calculator 206 calculating the granular data 214 for the identified behavioral constraint, the example target region calculator 206 determines whether there is another behavioral constraint to be identified (block 318). If the target region calculator 206 determines that there are other behavioral constraints, the target region calculator 206 repeats blocks 314, 316, 318 until no other behavioral constraints remain. For example, the target region calculator 206 repeats blocks 314, 316, 318 for the constraint associated with the show "Chicago Fire," the constraint associated with the show "The Good Wife."

If the example target region calculator 206 determines that there are no other behavioral constraints, the target region calculator 206 sets the example granular data 214 of the target region 102 (block 320). For example, the target region calculator 208 sets the granular data 214 of the target region 102 by integrating together the granular data 214 calculated by the target region calculator 206 at block 316 for the respective behavioral constraints identified by the target region calculator 206 at block 314. For example, the target region calculator 206 sets the granular data 214 of the target region 102 that were determined via the calculated minimum cross entropies at block 316 as shown below in Table 2.

TABLE 2

|  | Young Female | Old Female | Young Male | Old Male |
| --- | --- | --- | --- | --- |
| Shameless | 0.081 | 0.0402 | 0.1016 | 0.0303 |
| Chicago Fire | 0.2736 | 0.0383 | 0.0713 | 0.0407 |
| The Good Wife | 0.0126 | 0.0431 | 0.027 | 0.0807 |

The values provided above in example Table 2 represent quantities (e.g., counts, percentages, etc.) of members of the target region 102 satisfying corresponding demographic constraints of interest that also satisfy corresponding behavioral constraints of interest. For example, Table 2 shows the example target region calculator 206 calculated a value of '0.081' that indicates 8.10% of young females of the example target region 102 were tuned to the show "Shameless." As illustrated in Table 2, the granular data 214 calculated by the target region calculator 206 reduces variability of small values of the target region granular data 214 relative to the corresponding values of the granular data 212 of the source region 104 to increase accuracy and/or certainty of those values of the target region granular data 214. For example, the values of the target region granular data 214 for the show "Chicago Fire" and old females (e.g., '0.0383'), young males (e.g., '0.027'), and old males (e.g., '0.0165') that are represented by Table 2 are approximate to the respective values for the show "Chicago Fire" and old females (e.g., '0.03'), young males (e.g., '0.01'), and old males (e.g., '0.01') of the granular data 212 of the source region 104 as illustrated in FIG. 2.

FIG. 4 is a flow diagram representative of example machine readable instructions 316 that may be executed to implement the example target region calculator 206 of FIG. 2 to determine the granular data 214 of the target region 102 of FIG. 1 for the behavioral constraint identified at block 314. For example, the instructions 316 illustrated by the flow diagram of FIG. 4 may implement block 316 of FIG. 3.

Initially, at block 402, the example target region calculator 206 utilizes the minimum cross entropy to apportion the aggregate behavioral data 210 of the behavioral constraint identified at block 314 of FIG. 3. For example, the target region calculator 206 utilizes the minimum cross entropy (e.g., calculated via non-linear optimization) by solving for λ of Equation 4 that was constructed at block 312 of FIG. 3. By utilizing the minimum cross entropy, the example target region calculator 206 apportions the value of the aggregate tuning data 210 associated with the identified behavioral constraint (e.g., the constraint for the show "Shameless") among the demographic constraints associated with the aggregate demographics data 208 and the granular data 212 (e.g., the "young female" constraint, the "old female" constraint, the "young male" constraint, and the "old male" constraint).

At block 404, the example target region calculator 206 identifies one of the demographic constraints associated with the aggregate demographics data 208 and the granular data 212. For example, the target region calculator 206 identifies the "young female" demographic constraint. The example target region calculator 206 determines a value for a quantity (e.g., a count, a percentage) of members of the target region 102 (e.g., the example members 114a, 114b, 114c of FIG. 1) satisfying the identified demographic constraint that also satisfy the identified behavioral constraint (block 406). For example, the target region calculator 206 determines a quantity of '0.081' that indicates 8.10% of young females of the target region 102 were exposed to the show "Shameless."

At block 408, the example target region calculator 206 determines whether there is another demographic constraint to identify. For example, the target region calculator 206 determines whether there is another demographic constraint associated with the aggregate demographics data 208 and the granular data 212. If the target region calculator 206 determines that there is another demographic constraint, the target region calculator 206 repeats blocks 404, 406, 408 for the other demographic constraints. For example, the target region calculator 206 repeats blocks 404, 406, 408 for the "old female" constraint, the "young male" constraint, and the "old male" constraint. If the example target region calculator 206 determines that there are no other constraints, the target region calculator 206 sets the values determined at block 402 as the granular data 214 of the target region 102 for the behavioral constraint identified at block 314 (block 410). For example, the target region calculator 206 sets the granular data 214 for the identified behavioral constraint as shown below in Table 3.

TABLE 3

|  | Young Female | Old Female | Young Male | Old Male |
|---|---|---|---|---|
| Shameless | 8.10 | 4.02 | 10.16 | 3.03 |

FIGS. 5-8 describe an example environment 500 in which an Online Campaign Ratings (OCR) system and/or a Digital Ad Rating (DAR) system developed by The Nielsen Company (US), LLC is employed to monitor online activity. In the environment 500 in which the OCR and/or DAR system is employed, beacon instructions are downloaded to a client (e.g., a media presentation device) when the client requests media. The beacon instructions are, thus, executed whenever the media is accessed, be it from a server or from a cache. The beacon instructions cause monitoring data reflecting information about the access to the media to be sent from the client that downloaded the media to a monitoring entity (e.g., an audience measurement entity). Because the beaconing instructions are associated with the media and executed by a client browser whenever the media is accessed, the monitoring information is provided to the AME irrespective of whether the client is a panelist of the AME.

Figure 5:
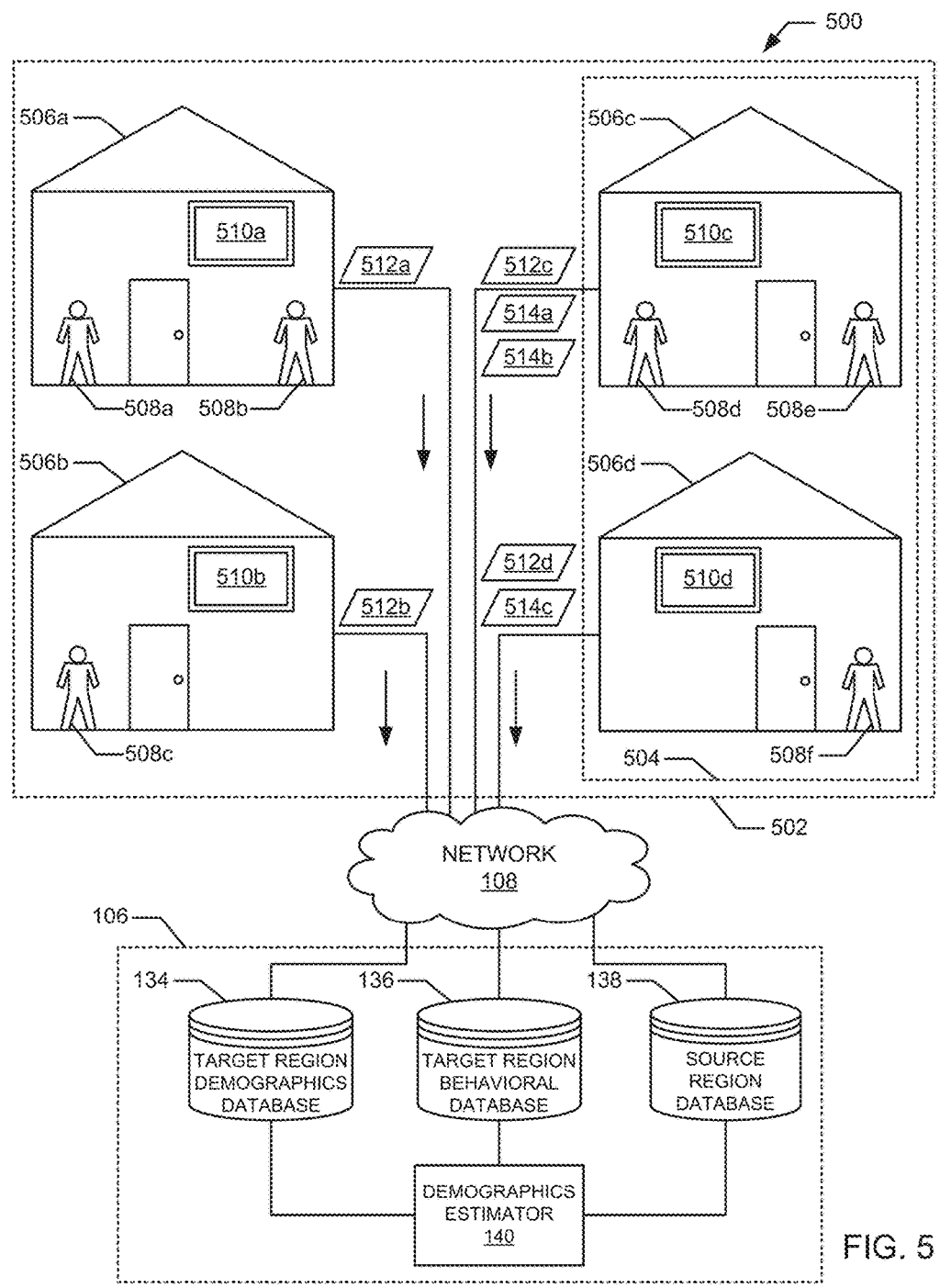
FIG. 5 is a block diagram of an example environment for online media campaign measurement in which aggregate data of a target region and granular data of a source region may be collected to determine granular data of the target region in accordance with the teachings of this disclosure.
Figure 6:
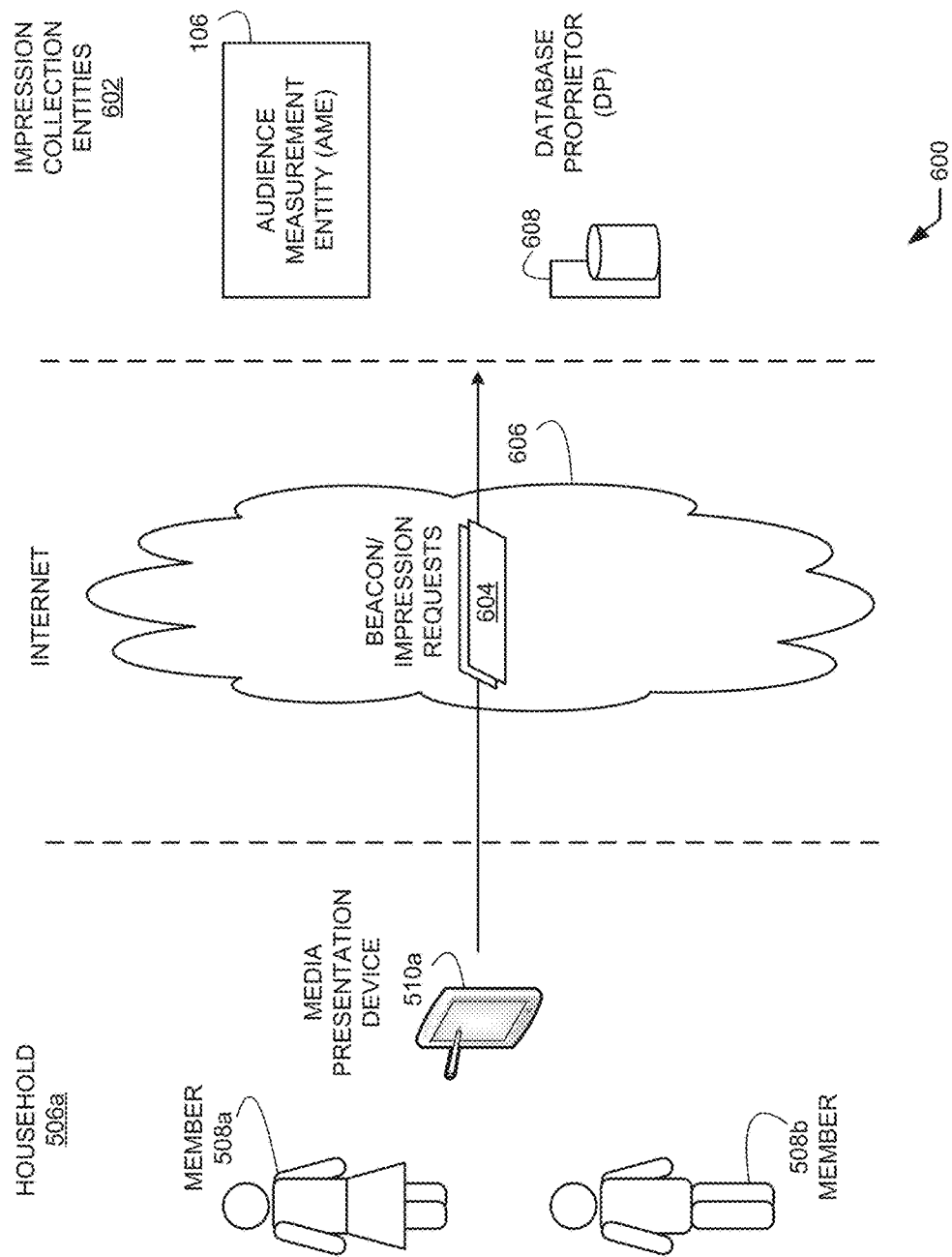
FIG. 6 is a block diagram of an example environment in which the example media presentation device of FIG. 5 reports audience impressions of media to impression collection entities to facilitate audience measurement for media.
Figure 7:
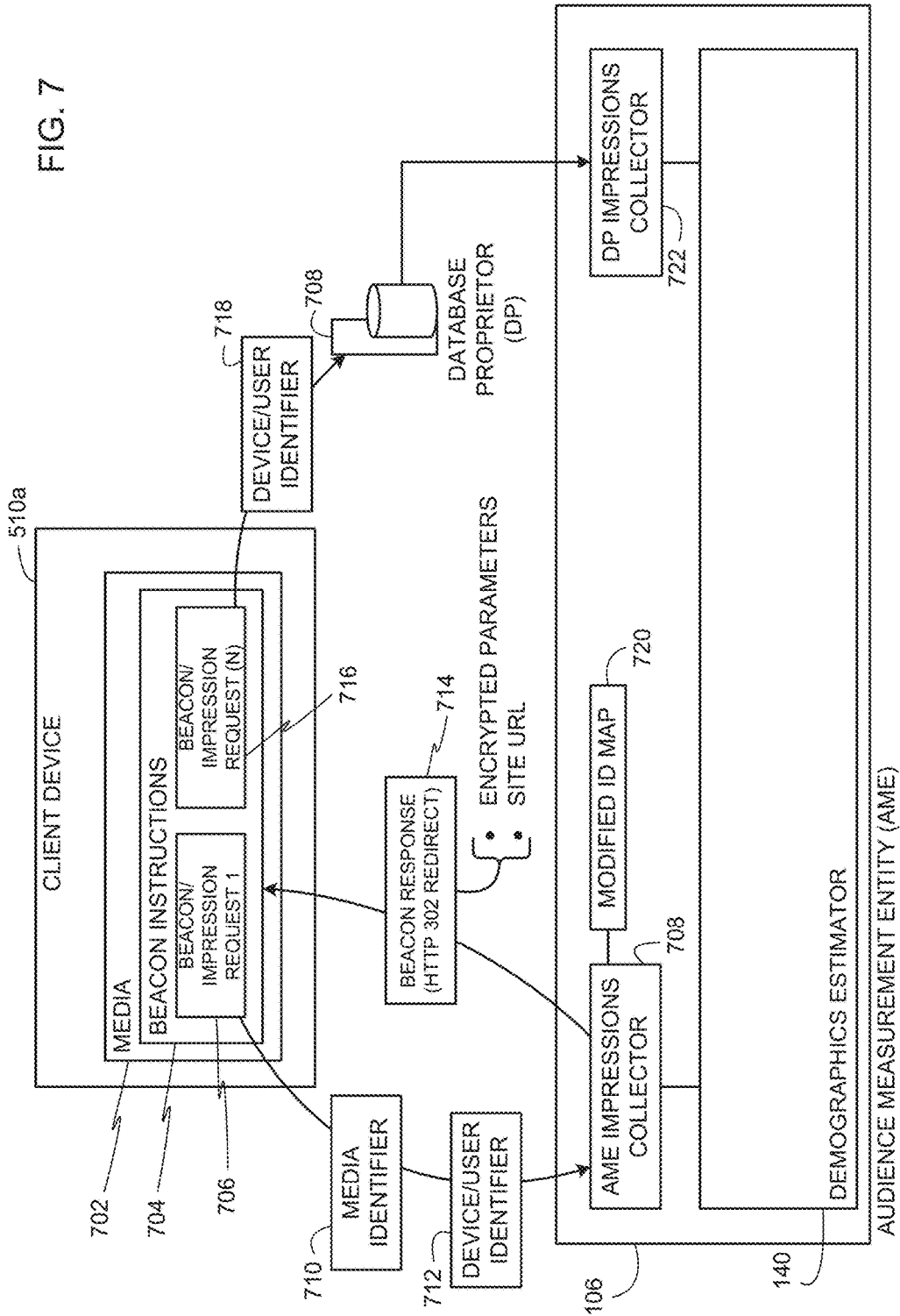
FIG. 7 is an example communication flow diagram illustrating an example manner in which the audience measurement entity of FIGS. 5 and 6 and a database proprietor of FIG. 6 collect data from the example media presentation device of the source region of FIG. 5.
Figure 8:
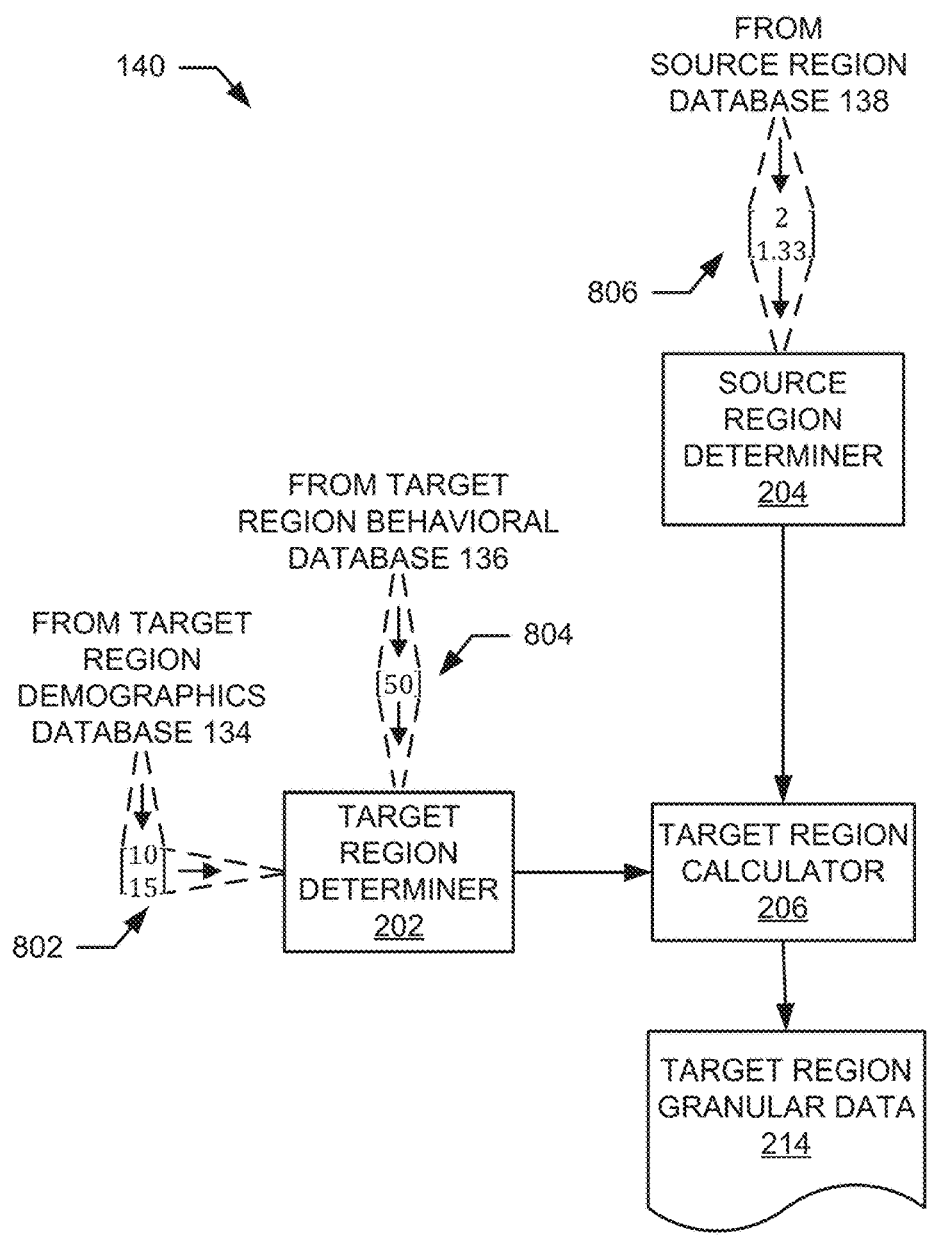
FIG. 8 is a block diagram of an example implementation of the demographics estimator of FIG. 5 that is to determine the granular data of the target region of the online media environment of FIG. 5.

The disclosed methods, apparatus and articles of manufacture of FIGS. 5-8 enable the AME to calculate scaling values or weights that correct for online impressions that are not associated with demographic constraints of interest (e.g., non-count or under-representation). As described in further detail below, FIG. 5 is a block diagram of the example environment 500 in which an OCR system and/or DAR system is employed for online media campaign measurement. The example environment 500 of FIG. 5 includes a region (e.g., a target region 502) in which online activity is monitored and a sub-region of panelists (e.g., a source region 504) of the region. Further, FIG. 6 is a block diagram of an example environment 600 in which an example media presentation device reports audience impressions of media to impression collection entities to facilitate audience measurement, FIG. 7 is an example communication flow diagram illustrating collection of data in an OCR and/or DAR system, and FIG. 8 is a block diagram of an example implementation of an example demographics estimator that is to utilize minimum cross entropy to calculate or determine scaling values or weights to correct for non-count.

FIG. 5 is a block diagram of the example environment 500 that includes the example target region 502, the example source region 504, the example AME 106, and the example network 108. The example AME 106 and the example network 108 of FIG. 5 are substantially similar to or identical to those components having the same reference numbers in FIG. 1, are described above in further detail in connection with FIG. 1, and will not be described in detail again.

In the illustrated example of FIG. 5, the target region 502 (e.g., a population) includes households 506a, 506b (e.g., non-panelist households) and households 506c, 506d (e.g., panelist households), and the source region 504 (e.g., a sub-region of the population) includes the households 506c, 506d (e.g., panelist households).

The example households 506a, 506b, 506c, 506d of the example environment 500 include example members 508a, 508b, 508c, 508d, 508e, 508f and example media presentation devices 510a, 510b, 510c, 510d. For example, the household 506a includes the members 508a, 508b and the media presentation device 510a, the household 506b includes the member 508c and the media presentation device 510b, the household 506c includes the members 508d, 508e and the media presentation device 510c, and the household 506d includes the member 508f and the media presentation device 510d.

In some examples, the households 506a, 506b, 506c, 506d are representative of many other households (e.g., other households of a non-panelist region) that may be included in the example target region 502. Additionally or alternatively, the households 506c, 506d are representative of many other households (e.g., other panelist households) that may be included in the example source region 504. Characteristics of the other households (e.g., a number of household members, demographics of the household members, a number of televisions, etc.) may be similar to and/or different from those of the representative households 506a, 506b, 506c, 506d. For example, other households include one member, two members, three members, four members, etc.

The media presentation devices 510a, 510b, 510c, 510d (e.g., client devices) of the illustrated example include devices capable of accessing media over a network. For example, the media presentation devices 510a 510b, 510c, 510d include computers, tablets, mobile devices, smart televisions, or other Internet-capable devices or appliances. The example media presentation devices 510a, 510b, 510c, 510d are used to collect corresponding example impression data 512a, 512b, 512c, 512d (e.g., behavioral data) for media accessed via the media presentation devices 510a, 510b, 510c, 510d.

Further, as illustrated in FIG. 5, the example members 508d, 508e, 508f (e.g., panelists) of the example source region 504 (e.g., a panelist sub-region of the population) provide respective example demographics data 514a, 514b, 514c. For example, the demographics data 514a includes person-specific information associated with the member 508d, the demographics data 514b includes person-specific information associated with the member 508e, and the demographics data 514c includes person-specific information associated with the member 508f. The demographics data 514a, 514b, 514c of the illustrated example identify which demographic constraints (e.g., demographic marginals of respective demographic dimensions, combinations of demographic marginals of combinations of respective demographic dimensions, etc.) are associated with the corresponding members 508d, 508e, 508f of the source region 104. For example, the demographics data 514a indicates that the member 508d satisfies the "male" demographic constraint, the demographics data 514b indicates that the member 508e satisfies the "female" demographic constraint, and the demographics data 514c indicates that the member 508f satisfies the "female" demographic constraint. The demographics data 514a, 514b, 514c may be provided by the members 508d, 508e, 508f via, for example, self-reporting, responding to surveys, etc.

The example demographics estimator 140 of the AME 106 of FIG. 5 utilizes the collected impressions data 512a, 512b, 512c, 512d of the target region 502 (e.g., the population), the demographics data 514a, 514b, 514c of the source region 504 (e.g., the panelist sub-region of the population), and demographics data of a database proprietor (e.g. a database proprietor 608 of FIGS. 6 and 7) to utilize a minimum cross entropy to calculate or determine scaling values or weights for demographic constraints of interest (e.g., granular data) for the target region 502. For example, the demographics estimator 140 determines the scaling values by utilizing the minimum cross entropy to determine quantities of impressions of the example target region 502 that are associated with demographics constraints of interest (e.g., the "male" demographic constraint, the "female" demographic constraint).

In some examples, the AME 106, the database proprietor (e.g. the database proprietor 608 of FIGS. 6 and 7) and/or the other entity associates an impression of online activity from the target region 502 with demographics of a person (e.g., the example members 508a, 508b, 508c, 508d, 508e, 508f) corresponding to the impression. In the illustrated example, the example target region demographics database 134 stores aggregate demographics data for members (e.g., the example members 508a, 508b, 508c, 508d, 508e, 508f) of the target region 502. For example, the aggregate demographics data stored by the target region demographics database 134 are obtained from a database proprietor (e.g., Facebook, Twitter, MySpace, Yahoo!, Google, Amazon.com, Buy.com, Experian, etc.) that has collected the demographics data from the members of the target region 502. Further, the example target region behavioral database 136 stores the recorded impressions of online activity (e.g., aggregate behavioral data) of the target region 502. For example, the target region behavioral database 136 stores the example impressions data 512a, 512b, 512c, 512d collected from the example media presentation devices 510a, 510b, 510c, 510d of the target region 502.

Further, based on the demographics data (e.g., the example demographics data 514a, 514b, 514c) collected from the panelists (e.g., the example members 508d, 508e, 508f) of the source region 504 (e.g., the panelist sub-region of the population), the example AME 106, the database proprietor and/or another entity identifies a quantity (e.g., a count, a percentage) of impressions of online activity associated with panelists (e.g., the example members 508d, 508e, 508f) for which corresponding demographic constraints of interest are identified. For example, the AME 106, the database proprietor and/or the other entity determines that 50% of impressions deriving from a male panelist are recorded as being associated with a male, and 75% of impressions deriving from a female panelist are recorded as being associated with a female. The example source region database 138 of FIG. 5 stores the recorded impressions of online activity and the demographics associated with the recorded impressions (e.g., granular data) of the example source region 504.

In some examples, the AME 106, a database proprietor and/or another entity are unable to associate a recorded impression with a demographic constraint of interest, thereby resulting in incomplete demographic impression data (e.g., data indicating characteristics of the people associated with the corresponding recorded impressions) of the target region 502.

Based on the data stored in the target region demographics database 134, the target region behavioral database 136, and the source region database 138, the example demographics estimator 140 determines scaling values or weights for the example target region 502 (e.g., granular data of the target region 502) by utilizing minimum cross entropy to determine quantities of impressions of online activity associated with the demographic constraints of interest.

FIG. 6 is a block diagram of the example environment 600 in which the example media presentation device 510a of the source region of FIG. 5 reports audience impressions of media to impression collection entities 602 to facilitate identifying total impressions and sizes of unique audiences exposed to different media. As used herein, the term impression collection entity refers to any entity that collects impression data. In the illustrated example, the media presentation device 510a employs a web browser and/or applications (e.g., apps) to access media, some of which include instructions that cause the media presentation device 510a to report media monitoring information to one or more of the impression collection entities 602. That is, when the media presentation device 510a of the illustrated example accesses media, a web browser and/or application of the media presentation device 510a executes instructions in the media to send a beacon request or impression request 604 to one or more of the impression collection entities 602 via, for example, the Internet 606. The beacon requests 604 of the illustrated example include information about accesses to media at the media presentation device 510a. Such beacon requests 604 allow monitoring entities, such as the impression collection entities 602, to collect impressions for different media accessed via the media presentation device 510a. In this manner, the impression collection entities 602 can generate large impression quantities for different media (e.g., different content and/or advertisement campaigns).

The impression collection entities 602 of the illustrated example include the AME 106 and an example database proprietor (DP) 608. In the illustrated example, the AME 106 does not provide the media to the media presentation device 510a and is a trusted (e.g., neutral) third party (e.g., The Nielsen Company, LLC) for providing accurate media access statistics. In the illustrated example, the database proprietor 608 is one of many database proprietors that operates on the Internet to provide services to large numbers of subscribers. Such services may be email services, social networking services, news media services, cloud storage services, streaming music services, streaming video services, online retail shopping services, credit monitoring services, etc. Example database proprietors include social network sites (e.g., Facebook, Twitter, MySpace, etc.), multi-service sites (e.g., Yahoo!, Google, etc.), online retailer sites (e.g., Amazon.com, Buy.com, etc.), credit reporting services (e.g., Experian) and/or any other web service(s) site that maintains user registration records. In examples disclosed herein, the database proprietor 608 maintains user account records corresponding to users registered for Internet-based services provided by the database proprietors. That is, in exchange for the provision of services, subscribers register with the database proprietor 608. As part of this registration, the subscribers provide detailed demographic information to the database proprietor 608. Demographic information may include, for example, gender, age, ethnicity, income, home location, education level, occupation, etc. In the illustrated example, the database proprietor 608 sets a device/user identifier (e.g., an identifier described below in connection with FIG. 7) on a subscriber's media presentation device 510a that enables the database proprietor 608 to identify the subscriber.

In the illustrated example, when the database proprietor 608 receives a beacon/impression request 604 from the media presentation device 510a, the database proprietor 608 requests the media presentation device 510a to provide the device/user identifier that the database proprietor 608 had previously set for the media presentation device 510a. The database proprietor 608 uses the device/user identifier corresponding to the media presentation device 510a to identify demographic information in its user account records corresponding to the subscriber of the media presentation device 510a. In this manner, the database proprietor 608 can generate demographic impressions by associating demographic information with an audience impression for the media accessed at the media presentation device 510a. As explained above, a demographic impression is an impression that is associated with a characteristic (e.g., a demographic characteristic) of the person exposed to the media.

In some examples, the database proprietor 608 is unable to identify the device/user identifier corresponding to the media presentation device 510a in its user account records. As a result, the database proprietor 608 is unable to identify demographic information from its user account records that correspond to the media presentation device 510a and/or the members 508a, 508b using the media presentation device 510a for the received beacon/impression request 604. In such examples, the database proprietor 608 records the received beacon/impression request 604 in a total impression count but does not record the beacon/impression request 604 in an impression count for a demographic constraint of interest (e.g., a "male" constraint, a "female" constraint). As used herein, a "non-count" or an "under-representation" refers to an impression that is recorded in a total impression count but is not recorded in an impression count for a demographic constraint of interest (e.g., a demographic impression).

Further, in some examples, the AME 106 establishes an AME panel of users (e.g., the example members 508d, 508e, 508f of the example source region 504 of FIG. 5) who have agreed to provide their demographic information and to have their Internet browsing activities monitored. Those members 508d, 508e, 508f provide detailed information concerning the person's identity and demographics (e.g., the corresponding example demographics data 514a, 514b, 514c of FIG. 5) to the AME 106. The AME 106 sets a device/user identifier (e.g., an identifier described below in connection with FIG. 7) on the media presentation device (e.g., the example media presentation devices 510c, 510d of FIG. 5) corresponding to the panelist (e.g., the members 508d, 508e, 508f) that enables the AME 106 to identify the panelist. An AME panel may be a cross-platform home television/computer (TVPC) panel built and maintained by the AME 106. In other examples, the AME panel may be a computer panel or internet-device panel without corresponding to a television audience panel. In yet other examples, the AME panel may be a cross-platform radio/computer panel and/or a panel formed for other mediums.

In such examples, when the AME 106 receives a beacon request 604 from the media presentation device (e.g., the media presentation devices 510c, 510d) of the source region 504, the AME 106 requests the media presentation device to provide the AME 106 with the device/user identifier that the AME 106 previously set in the media presentation device. The AME 106 uses the device/user identifier corresponding to the media presentation device 510a to identify demographic information in its user records corresponding to the panelist of the media presentation device of the source region 504. In this manner, the AME 106 can generate demographic impressions (e.g., granular data of the source region 504) by associating demographic information (e.g., the example demographics data 514a, 514b, 514c of the source region 504 of FIG. 5) with an audience impression (e.g., the example impressions data 512c, 512d of the source region 504 of FIG. 5) for the media accessed in the source region. In some examples, members (e.g., the members 508d, 508e) share a media presentation device (e.g., the media presentation device 510c) to access the internet-based service of the database proprietor 608 and to access other media via the Internet 606. In the illustrated example, when the database proprietor 608 receives a beacon/impression request 604 for media accessed via the media presentation device 510c, the database proprietor 608 logs an impression for the media access as corresponding to the member 508d, 508e of the household 506c that most recently logged into the database proprietor 608.

FIG. 7 is an example communication flow diagram illustrating an example manner in which the audience measurement entity 106 and the example database proprietor 608 collect data from the media presentation device 510a of the example source region 504. For example, FIG. 7 illustrates an example manner in which the AME 106 and the database proprietor 608 of FIG. 6 can collect impressions and demographic information based on the media presentation device 510a reporting impressions to the AME 106 and the database proprietor 608. In the illustrated example, the demographics estimator 140 is to correct for non-count or under-representation by the database proprietor 608. The example chain of events shown in FIG. 7 occurs when the media presentation device 510a accesses media for which the media presentation device 510a reports an impression to the AME 106 and the database proprietor 608. In some examples, the media presentation device 510a reports impressions for accessed media based on instructions (e.g., beacon instructions) embedded in the media that instruct the media presentation device 510a (e.g., instruct a web browser or an app in the media presentation device 510a) to send beacon/impression requests (e.g., the beacon/impression requests 604 of FIG. 6) to the AME 106 and/or the database proprietor 608. In such examples, the media having the beacon instructions is referred to as tagged media. In other examples, the media presentation device 510a reports impressions for accessed media based on instructions embedded in apps or web browsers that execute on the media presentation device 510a to send beacon/impression requests (e.g., the beacon/impression requests 604 of FIG. 6) to the AME 106, and/or the database proprietor 608 for corresponding media accessed via those apps or web browsers. In any case, the beacon/impression requests (e.g., the beacon/impression requests 604 of FIG. 6) include device/user identifiers (e.g., AME IDs and/or DP IDs) as described further below to allow the corresponding AME 106 and/or database proprietor 608 to associate demographic information with resulting logged impressions.

In the illustrated example, the media presentation device 510a accesses media 702 tagged with beacon instructions 704. The beacon instructions 704 cause the media presentation device 510a to send a beacon/impression request 706 to an AME impressions collector 708 when the media presentation device 510a accesses the media 702. For example, a web browser and/or app of the media presentation device 510a executes the beacon instructions 704 in the media 702 which instruct the browser and/or app to generate and send the beacon/impression request 706. In the illustrated example, the media presentation device 510a sends the beacon/impression request 706 to the AME impression collector 708 using an HTTP (hypertext transfer protocol) request addressed to the URL (uniform resource locator) of the AME impressions collector 708 at, for example, a first internet domain of the AME 106. The beacon/impression request 706 of the illustrated example includes a media identifier 710 (e.g., an identifier that can be used to identify content, an advertisement, and/or any other media) corresponding to the media 702. In some examples, the beacon/impression request 706 also includes a site identifier (e.g., a URL) of the website that served the media 702 to the media presentation device 510a and/or a host website ID (e.g., www.acme.com) of the website that displays or presents the media 702. In the illustrated example, the beacon/impression request 706 includes a device/user identifier 712. In the illustrated example, the device/user identifier 712 that the media presentation device 510a provides in the beacon impression request 706 is an AME ID because it corresponds to an identifier that the AME 106 uses to identify a user (e.g., the example members 508a, 508b of FIG. 5) corresponding to the media presentation device 510a. In other examples, the media presentation device 510a may not send the device/user identifier 712 until the media presentation device 510a receives a request for the same from a server of the AME 106 (e.g., in response to, for example, the AME impressions collector 708 receiving the beacon/impression request 706).

In some examples, the device/user identifier 712 may be a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the AME 106 stores in association with demographic information about users of the media presentation devices (e.g., the media presentation devices 510a, 510b, 510c of FIG. 5). When the AME 106 receives the device/user identifier 712, the AME 106 can obtain demographic information corresponding to a user of the media presentation device 510a based on the device/user identifier 712 that the AME 106 receives from the media presentation device 510a. In some examples, the device/user identifier 712 may be encrypted (e.g., hashed) at the media presentation device 510a so that only an intended final recipient of the device/user identifier 712 can decrypt the hashed identifier 712. For example, if the device/user identifier 712 is a cookie that is set in the media presentation device 510a by the AME 106, the device/user identifier 712 can be hashed so that only the AME 106 can decrypt the device/user identifier 712. If the device/user identifier 712 is an IMEI number, the media presentation device 510a can hash the device/user identifier 712 so that only a wireless carrier (e.g., the database proprietor 608) can decrypt the hashed identifier 712 to recover the IMEI for use in accessing demographic information corresponding to the user of the media presentation device 510a. By hashing the device/user identifier 712, an intermediate party (e.g., an intermediate server or entity on the Internet) receiving the beacon request cannot directly identify a user of the media presentation device 510a.

In response to receiving the beacon/impression request 706, the AME impressions collector 708 logs an impression for the media 702 by storing the media identifier 710 contained in the beacon/impression request 706. In the illustrated example of FIG. 7, the AME impressions collector 708 also uses the device/user identifier 712 in the beacon/impression request 706 to identify AME panelist demographic information corresponding to a panelist of the media presentation device 510a. That is, the device/user identifier 712 matches a user ID of a panelist member (e.g., a panelist corresponding to a panelist profile maintained and/or stored by the AME 106). In this manner, the AME impressions collector 708 can associate the logged impression with demographic information of a panelist corresponding to the media presentation device 510a. Additionally or alternatively, the AME 106 may obtain demographics information from the database proprietor 608 for the logged impression if the media presentation device 510a corresponds to a subscriber of the database proprietor 608.

In the illustrated example of FIG. 7, to compare or supplement panelist demographics (e.g., for accuracy or completeness) of the AME 106 with demographics from one or more database proprietors (e.g., the database proprietor 608), the AME impressions collector 708 returns a beacon response message 714 (e.g., a first beacon response) to the media presentation device 510*a* including an HTTP "302 Found" re-direct message and a URL of a participating database proprietor 608 at, for example, a second internet domain. In the illustrated example, the HTTP "302 Found" re-direct message in the beacon response 714 instructs the media presentation device 510*a* to send a second beacon request 716 to the database proprietor 608. In other examples, instead of using an HTTP "302 Found" re-direct message, redirects may be implemented using, for example, an iframe source instruction (e.g., <iframe src=" ">) or any other instruction that can instruct a client device to send a subsequent beacon request (e.g., the second beacon request 716) to a participating database proprietor 608. In the illustrated example, the AME impressions collector 708 determines the database proprietor 608 specified in the beacon response 714 using a rule and/or any other suitable type of selection criteria or process. In some examples, the AME impressions collector 708 determines a particular database proprietor to which to redirect a beacon request based on, for example, empirical data indicative of which database proprietor is most likely to have demographic data for a user corresponding to the device/user identifier 712. In some examples, the beacon instructions 704 include a pre-defined URL of one or more database proprietors to which the media presentation device 510*a* should send follow up beacon requests 716. In other examples, the same database proprietor is always identified in the first redirect message (e.g., the beacon response 714).

In the illustrated example of FIG. 7, the beacon/impression request 716 may include a device/user identifier 718 that is a DP ID because it is used by the database proprietor 608 to identify a subscriber of the media presentation device 510*a* when logging an impression. In some instances (e.g., in which the database proprietor 608 has not yet set a DP ID in the media presentation device 510*a*), the beacon/impression request 716 does not include the device/user identifier 718. In some examples, the DP ID is not sent until the DP requests the same (e.g., in response to the beacon/impression request 716). In some examples, the device/user identifier 718 is a device identifier (e.g., an international mobile equipment identity (IMEI), a mobile equipment identifier (MEID), a media access control (MAC) address, etc.), a web browser unique identifier (e.g., a cookie), a user identifier (e.g., a user name, a login ID, etc.), an Adobe Flash® client identifier, identification information stored in an HTML5 datastore, and/or any other identifier that the database proprietor 608 stores in association with demographic information about subscribers corresponding to the media presentation devices (e.g., the example media presentation devices 510*a*, 510*b*, 510*c* of FIG. 5). When the database proprietor 608 receives the device/user identifier 718, the database proprietor 608 can obtain demographic information corresponding to a user of the media presentation device 510*a* based on the device/user identifier 718 that the database proprietor 608 receives from the media presentation device 510*a*. In some examples, the device/user identifier 718 may be encrypted (e.g., hashed) at the media presentation device 510*a* so that only an intended final recipient of the device/user identifier 718 can decrypt the hashed identifier 718. For example, if the device/user identifier 718 is a cookie that is set in the media presentation device 510*a* by the database proprietor 608, the device/user identifier 718 can be hashed so that only the database proprietor 608 can decrypt the device/user identifier 718. If the device/user identifier 718 is an IMEI number, the media presentation device 510*a* can hash the device/user identifier 718 so that only a wireless carrier (e.g., the database proprietor 608) can decrypt the hashed identifier 718 to recover the IMEI for use in accessing demographic information corresponding to the user of the media presentation device 510*a*. By hashing the device/user identifier 718, an intermediate party (e.g., an intermediate server or entity on the Internet) receiving the beacon request cannot directly identify a user of the media presentation device 510*a*. For example, if the intended final recipient of the device/user identifier 718 is the database proprietor 608, the AME 106 cannot recover identifier information when the device/user identifier 718 is hashed by the media presentation device 510*a* for decrypting only by the intended database proprietor 608.

In some examples that use cookies as the device/user identifier 718, when a user deletes a database proprietor cookie from the media presentation device 510*a*, the database proprietor 608 sets the same cookie value in the media presentation device 510*a* the next time the user logs into a service of the database proprietor 608. In such examples, the cookies used by the database proprietor 608 are registration-based cookies, which facilitate setting the same cookie value after a deletion of the cookie value has occurred on the media presentation device 510*a*. In this manner, the database proprietor 608 can collect impressions for the media presentation device 510*a* based on the same cookie value over time to generate unique audience (UA) sizes while eliminating or substantially reducing the likelihood that a single unique person will be counted as two or more separate unique audience members.

Although only a single database proprietor 608 is shown in FIGS. 6 and 7, the impression reporting/collection process of FIGS. 6 and 7 may be implemented using multiple database proprietors. In some such examples, the beacon instructions 704 cause the media presentation device 510*a* to send beacon/impression requests 716 to numerous database proprietors. For example, the beacon instructions 704 may cause the media presentation device 510*a* to send the beacon/impression requests 716 to the numerous database proprietors in parallel or in daisy chain fashion. In some such examples, the beacon instructions 704 cause the media presentation device 510*a* to stop sending beacon/impression requests 716 to database proprietors once a database proprietor has recognized the media presentation device 510*a*. In other examples, the beacon instructions 704 cause the media presentation device 510*a* to send beacon/impression requests 716 to database proprietors so that multiple database proprietors can recognize the media presentation device 510*a* and log a corresponding impression. In any case, multiple database proprietors are provided the opportunity to log impressions and provide corresponding demographics information if the user of the media presentation device 510*a* is a subscriber of services of those database proprietors.

In some examples, prior to sending the beacon response 714 to the media presentation device 510*a*, the AME impressions collector 708 replaces site IDs (e.g., URLs) of media provider(s) that served the media 702 with modified site IDs (e.g., substitute site IDs) which are discernable only by the AME 106 to identify the media provider(s). In some examples, the AME impressions collector 708 may also replace a host website ID (e.g., www.acme.com) with a modified host site ID (e.g., a substitute host site ID) which is discernable only by the AME 106 as corresponding to the host website via which the media 702 is presented. In some examples, the AME impressions collector 708 also replaces the media identifier 710 with a modified media identifier 710 corresponding to the media 702. In this way, the media provider of the media 702, the host website that presents the media 702, and/or the media identifier 710 are obscured from the database proprietor 608, but the database proprietor 608 can still log impressions based on the modified values which can later be deciphered by the AME 106 after the AME 106 receives logged impressions from the database proprietor 608. In some examples, the AME impressions collector 708 does not send site IDs, host site IDS, the media identifier 710 or modified versions thereof in the beacon response 714. In such examples, the media presentation device 510a provides the original, non-modified versions of the media identifier 710, site IDs, host IDs, etc. to the database proprietor 608.

In the illustrated example, the AME impression collector 708 maintains a modified ID mapping table 720 that maps original site IDs with modified (or substitute) site IDs, original host site IDs with modified host site IDs, and/or maps modified media identifiers to the media identifiers such as the media identifier 710 to obfuscate or hide such information from database proprietors such as the database proprietor 608. Also in the illustrated example, the AME impressions collector 708 encrypts all of the information received in the beacon/impression request 706 and the modified information to prevent any intercepting parties from decoding the information. The AME impressions collector 708 of the illustrated example sends the encrypted information in the beacon response 714 to the media presentation device 510a so that the media presentation device 510a can send the encrypted information to the database proprietor 608 in the beacon/impression request 716. In the illustrated example, the AME impressions collector 708 uses an encryption that can be decrypted by the database proprietor 608 site specified in the HTTP "302 Found" re-direct message. Periodically or aperiodically, the impression data collected by the database proprietor 608 is provided to a DP impressions collector 722 of the AME 106 as, for example, batch data.

Additional examples that may be used to implement the beacon instruction processes of FIG. 7 are disclosed in Mainak et al., U.S. Pat. No. 8,370,489, which is hereby incorporated herein by reference in its entirety. In addition, other examples that may be used to implement such beacon instructions are disclosed in Blumenau, U.S. Pat. No. 6,108,637, which is hereby incorporated herein by reference in its entirety.

Returning to the example demographics estimator 140, FIG. 8 is a block diagram of an example implementation of the demographics estimator 140 that is to utilize minimum cross entropy to calculate or determine the scaling values or weights (e.g., granular data) for demographic constraints of interest to correct for non-count or under-representation of impressions for the target region 502 of FIG. 5. As illustrated in FIG. 8, the example demographics estimator 140 includes the example target region determiner 202, the example source region determiner 204, and the example target region calculator 206. The target region determiner 202, the source region determiner 204, and the target region calculator 206 of FIG. 8 are substantially similar or identical to those components having the same reference numbers in FIG. 2. Those components are described above in further detail in connection with FIG. 2 and will not be described in detail again.

The target region determiner 202 of the illustrated example determines aggregate demographics data 802 of the example target region 502 (e.g., a population). For example, the target region determiner 202 collects the aggregate demographics data 802 that is based on demographics data of a database proprietor from the example target region demographics database 134 of FIG. 5. For example, the target region determiner 202 collects the example aggregate demographics data 802 in vector form. Elements of the example aggregate demographics data 802 correspond to demographic constraints of interest. For example, an element of a first row of the example aggregate demographics data 802 corresponds with a "male" demographic constraint and an element of a second row corresponds with a "female" demographic constraint. The elements of the example aggregate demographics data 802 represent quantities (e.g., counts, percentages) of the target region 502 that match, belong to and/or satisfy the corresponding demographics of interest. For example, the element of the first row of the aggregate demographics data 802 indicates that 10 recorded impressions of the target region 502 were associated with the "male" constraint and 15 recorded impressions of the target region 502 were associated with the "female" constraint.

Further, the example target region determiner 202 determines aggregate impressions data 804 (e.g., aggregate behavioral data) of the example target region 502 (e.g., a population). For example, the target region determiner 202 collects the aggregate impressions data 804 that is based on the example impressions data 512a, 512b, 512c, 512d of the example households 506a, 506b, 506c, 506d of the target region 502 from the example target region behavioral database 136 of FIG. 5. In the illustrated example, the aggregate impression data 804 determined by the target region determiner 202 indicates that there were 50 recorded impressions for the example target region 502. Thus, the aggregate demographics data 802 and the aggregate impressions data 804 of the illustrated example indicate that 50% of the impressions (e.g., 25 impressions associated with a demographic constraint of the 50 total impressions) of the target region 502 are not associated with a demographic constraint (e.g., are non-counts or under-representations).

The source region determiner 204 of the illustrated example determines granular data 806 of the example source region 504 of FIG. 5. For example, the source region determiner 204 collects the granular data 806 that is based on impressions data (e.g., the example impressions data 512c, 512d of FIG. 5) and demographics data (e.g., the example demographics data 514a, 514b, 514c of FIG. 5) of panelist households (e.g., the example households 506a, 506b of FIG. 5) of the source region 504 (e.g., the panelist sub-region of the population) from the example source region database 138 of FIG. 5.

As illustrated in FIG. 8, the example source region determiner 204 collects the example granular data 806 in vector form. In the illustrated example, rows of the granular data 806 collected by the source region determiner 204 correspond to behavioral constraints of interest. The demographic constraints of the example granular data 214 are the same demographic constraints of the example aggregate demographics data 802. For example, a first row of the granular data 214 corresponds with a "male" constraint, and a second row corresponds with a "female" constraint.

Elements of the granular data 806 collected by the source region determiner 204 represent scaling values or weights that are inverses of percentages of recorded impressions associated with demographic constraints recorded for those demographic constraints. For example, the data stored in the example source region database 138 indicate that 50% (e.g., 0.5 in decimal form) of impressions associated with the "male" constraint are recorded as being associated with the "male" constraint, and 75% (e.g., 0.75 in decimal form) of impressions associated with the "female" constraint are recorded as being associated with the "female" constraint. Thus, in such examples, the example granular data 806 determined by the example source region determiner 204 includes a scaling value or weight of '2' (i.e., the inverse of 0.5) in the first row associated with the "male" constraint and includes a scaling value or weight of '1.33' (i.e., the inverse of 0.75) in the second row associated with the "female" constraint.

In the illustrated example, the target region calculator 206 utilizes minimum cross entropy to calculate or determine the target region granular data 214 that includes scaling values or weights for the example target region 502 to account for non-counts or under-representations when determining quantities of impressions associated with the demographic constraints of interest. The target region calculator 206 of the illustrated example utilizes the minimum cross entropy to determine the target region granular data 214 that includes a scaling value or weight for the "male" demographic constraint and a scaling value or weight for the "female" demographic constraint. To compensate for non-count or under-representation of impressions, the example target region calculator 206 applies (e.g., multiplies, scales up) the weights determined via the calculated minimum cross entropy to the aggregate demographics data 802 to determine quantities (e.g., counts, percentages) of the total impression count of the example aggregate impression data 804 that are recorded for the demographic constraints of interest. For example, the target region calculator 206 multiplies the determined weight value for the "male" demographic constraint by '10' to determine a portion of the 50 impressions of the target region 502 that are associated with males and multiplies the determined weight value for the "female" demographic constraint by '15' to determine a portion of the 50 impressions of the target region 502 that are associated with females.

Thus, the example demographics estimator 140 of FIGS. 5 and/or 8 enables the example AME 106 or other entity to utilize the minimum cross entropy to calculate the granular data 214 of the example target region 502 based on the example aggregate demographics data 802 and the example aggregate tuning data 802 of the target region 502, thereby reducing an amount of data collected from the target region 502 by computer networked data collection systems. As a result, the example demographics estimator 140 enables the example AME 106 or other entity to overcome non-count or under-representation of impressions when determining portions of recorded impressions for online activity that are associated with demographic constraints of interest.

Figure 9:
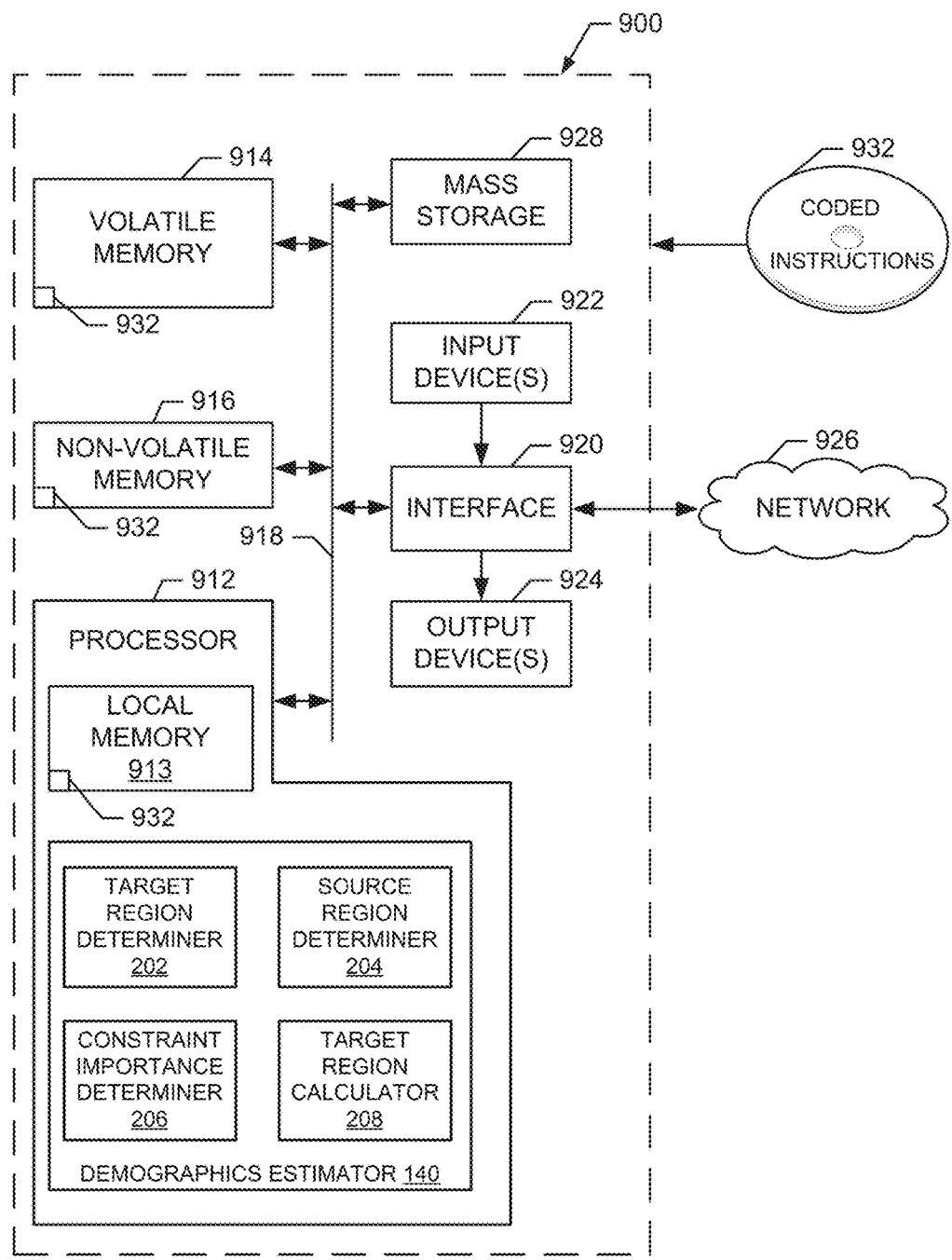
FIG. 9 is a block diagram of an example processor system structured to execute the example machine readable instructions represented by FIGS. 3 and/or 4 to implement the demographics estimator of FIGS. 1, 2, 5 and/or 8.

FIG. 9 is a block diagram of an example processor platform 900 structured to execute the instructions of FIGS. 3 and/or 4 to implement the demographics estimator 140 of FIGS. 1, 2, 5, and/or 8. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The processor 912 of the illustrated example includes the example target region determiner 202, the example source region determiner 204, the example target region calculator 206 and/or, more generally, the demographics estimator 140.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

Coded instructions 932 of FIGS. 3 and/or 4 may be stored in the mass storage device 928, in the volatile memory 914, in the non-volatile memory 916, and/or on a removable tangible computer readable storage medium such as a CD or DVD.

From the foregoing, it will be appreciated that the above disclosed methods, apparatus and articles of manufacture enable an audience measurement entity to reduce an amount of computer memory and computer processing resources of computer networked data collection systems utilized to collect data of a target region by enabling an audience measurement entity to utilize minimum cross entropy to calculate granular data of a target region based on aggregate data of the target region and granular data of a source region. For example, by utilizing minimum cross entropy, the above disclosed methods, apparatus and articles of manufacture enable the audience measurement entity to calculate the granular data of the target region without having to implement complex processes for gathering detailed behavioral and demographics data from regions having small populations.

Further, the above disclosed methods, apparatus and articles of manufacture enable an audience measurement entity to utilize minimum cross entropy to calculate granular exposure data of a non-panelist region based on tuning data collected (e.g., tuning event data collected via computerized media presentation devices connected to a computer network that facilitates presentation of media) from households of the non-panelist region. Additionally or alternatively, the above disclosed methods, apparatus and articles of manufacture enable an audience measurement entity to utilize minimum cross entropy to calculate granular impressions data for online activity of a population including non-panelists based on aggregate impressions data (e.g., recorded online activity data collected via computerized media presentation devices connected to a computer network that facilitates presentation of media) of the population. Thus, it will be appreciated that the above disclosed methods, apparatus and articles of manufacture reduce processing resource utilization to compute a media audience measurement of the target region by utilizing minimum cross entropy to use data collected from the computerized media presentation devices via the computer network without collecting person-specific data from members of the target region.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system for calculating granular data of a region for media audience measurement, the system comprising:
    means for target region determining to:
        aggregate behavioral data associated with a measurement of a media audience of a target region, the aggregate behavioral data including a first count of target region audience members satisfying a behavioral constraint; and
        aggregate demographics data of the target region, the aggregate demographics data including a second count of the target region audience members satisfying a first demographic constraint and a third count of the target region audience members satisfying a second demographic constraint;
    means for source region determining to determine granular data of a source region, the granular data including a fourth count of source region audience members satisfying the behavioral constraint and the first demographic constraint and a fifth count of the source region audience members satisfying the behavioral constraint and the second demographic constraint; and
    means for target region calculating to calculate granular data of the media audience of the target region utilizing minimum cross entropy, the target region calculating means to apportion the aggregate demographics data and the aggregate behavioral data of the target region based on the granular data of the source region, the granular data of the media audience of the target region including a sixth count of the target region audience members satisfying the behavioral constraint and the first demographic constraint and a seventh count of the target region audience members satisfying the behavioral constraint and the second demographic constraint, the target region determining means to reduce an amount of computer memory and computer processing resources of computer networked data collection systems utilized to collect data of the target region to determine the granular data of the media audience of the target region by calculating the granular data of the target region without collecting person-specific data from members of the target region, the calculated granular data of the media audience of the target region being based on the aggregate demographics data of the target region, the aggregate behavioral data of the target region, and the granular data of the source region.

2. The system as defined in claim 1, wherein the first demographic constraint and the second demographic constraint are mutually exclusive.

3. The system as defined in claim 1, wherein the target region calculating means is to calculate, by utilizing the minimum cross entropy, the granular data of the media audience of the target region by performing non-linear optimization based on the granular data of the source region, the aggregate demographics data of the target region, and the aggregate behavioral data of the target region.

4. The system as defined in claim 1, wherein the target region calculating means is to calculate, by utilizing the minimum cross entropy, the granular data of the media audience of the target region by defining an optimization constraint based on the aggregate behavioral data and the aggregate demographics data of the target region, the non-linear optimization being limited by the optimization constraint.

5. The system as defined in claim 1, wherein the target region calculating means is to, prior to utilizing the minimum cross entropy, determine whether to calculate the granular data of the media audience of the target region via the minimum cross entropy by evaluating the fourth count and the fifth count of the granular data of the source region.

6. The system as defined in claim 1, wherein target region determining means is to determine the aggregate behavioral data of the target region by determining tuning data of the target region and determining the granular data of the source region includes determining exposure data of the source region.

7. The system as defined in claim 1, wherein the target region is a non-panelist region and the source region is a panelist region, the non-panelist region and the panelist region being mutually exclusive.

8. The system as defined in claim 1, wherein the target region determining means is to:
    determine impressions data of a population; and
    determine the granular data of the source region by determining impressions data associated with demographics data of panelists, the target region being the population and the source region being a sub-region of panelists of the population.

9. The system as defined in claim 1, wherein the target region calculating means is to increase an accuracy of the granular data of the media audience by applying the minimum cross entropy to reduce variability of the audience of the target region.

10. The system as defined in claim 9, wherein the target region calculating means is to determine whether to utilize the minimum cross entropy to reduce the variability of the audience of the target region based a degree of confidence of at least one of the aggregate behavioral data, the aggregate demographics data or the granular data.

11. The system as defined in claim 1, wherein the behavioral constraint is associated with exposure to a media program.

12. The system as defined in claim 1, wherein the first demographic constraint is associated with at least one demographic marginal, demographic joint-marginal, or demographic joint.

13. The system as defined in claim 1, wherein the second demographic constraint is associated with at least one demographic marginal, demographic joint-marginal, or demographic joint.

* * * * *